United States Patent [19]

Ross

[11] Patent Number: 4,579,525

[45] Date of Patent: Apr. 1, 1986

[54] APPARATUS AND A PROCESS FOR HEATING A MATERIAL

[76] Inventor: Donald R. Ross, P.O. Box 1089, Mesa, Ariz. 85201

[21] Appl. No.: 624,031

[22] Filed: Jun. 25, 1984

Related U.S. Application Data

[60] Continuation-in-part of Ser. No. 406,705, Aug. 9, 1982, Pat. No. 4,457,703, which is a continuation-in-part of Ser. No. 127,451, Mar. 5, 1980, abandoned, which is a division of Ser. No. 787,713, Apr. 14, 1977, Pat. No. 4,263,163.

[51] Int. Cl.[4] .......................... F27B 14/00; F27B 9/16; C04B 31/22

[52] U.S. Cl. ...................................... 432/13; 110/332; 252/378 R; 431/328; 432/138

[58] Field of Search ........................... 432/13, 58, 138; 431/328; 110/332; 252/378 R, 378 P

[56] References Cited

U.S. PATENT DOCUMENTS

| | | | |
|---|---|---|---|
| 1,308,364 | 7/1919 | Lucke | 431/328 |
| 1,485,110 | 2/1924 | Beth | 432/138 |
| 1,948,173 | 2/1934 | Hagan | 432/58 |
| 3,528,648 | 9/1970 | Strand | 432/13 |

*Primary Examiner*—John J. Camby
*Attorney, Agent, or Firm*—Thomas W. Secrest

[57] ABSTRACT

This invention is directed to a method and an apparatus to heat certain particles. These certain particles are heated to make them more desirable. In the heating of these particles, it is often desirable to expand the particles to make a light-weight aggregate. The light-weight aggregate may be used in making a building material or the like. In carrying out the process of heating these particles, there is used air for combustion of the combustible fuel and only a mimimum of air for carrying of the particles or expansion of the particles.

32 Claims, 29 Drawing Figures

APPARATUS AND A PROCESS FOR HEATING A MATERIAL

This patent application is a continuation-in-part of copending application Ser. No. 406,705 filed on Aug. 9, 1982, now U.S. Pat. No. 4,457,703, which patent application was a continuation-in-part of copending patent application Ser. No. 127,451 filed Mar. 5, 1980, now abandoned, and which patent application was a divisional patent application of co-pending patent application Ser. No. 787,713 filed Apr. 14, 1977, now U.S. Pat. No. 4,263,163.

THE GENERAL BACKGROUND OF THE INVENTION

For, approximately, twenty-five years, certain materials, such as zeolite, vermiculite, perlite, and the like have been expanded into light-weight aggregates. Since 1946, there has been developed apparatus and methods for expanding these certain materials. These materials are given a heat treatment in the range of about 700° F. to about 3000° F. to process them into expanded solid particles. A material which may be used for illustrative purposes is perlite.

Perlite is an alumina-silicate mineral that is noncrystaline and glasslike in its nature. When perlite ore is ground to the approximate particle size of sand, it has a density of about 75 lbs. per cubic foot, although this density can vary somewhat. Perlite contains a small amount of sodium oxide and potassium oxide which acts as a flux and reduces the melting point of the mixture of the perlite and the oxide. Also, there is a small percentage of chemically combined water in the perlite. When high temperature is applied to a perlite particle, the surface softens and the water turns to steam causing the perlite particle to expand. The average density of the expanded perlite particle is 8 lbs. per cubic foot, although it is possible to get the density as low as 3 or 4 lbs. per cubic foot. The particle size of the expanded product is controlled, to a degree, by the particle size of the ore. The various markets for expanded perlite particles are, essentially, controlled by the particle size of the expanded product.

The perlite ore is mined by open pit methods, either drill and blast, or in some cases, dug, directly, with large bulldozers and rippers. The ore is then transported to a mill where the rock is crushed, ground, dried, and screened to various particle size ranges to meet specifications for various markets. The finished ore is then shipped by covered hopper cars all over the country to expanding plants where it is heated and expanded into its final form and distributed from these plants. The ore presently used comes from five states: New Mexico, Colorado, Arizona, California and Idaho. Probably, 85% of the ore is mined at No Aqua, N. Mex., and shipped from Antonito, Colo., the closest rail head.

At the present time, the largest particle size of perlite ore used for expansion purposes is about ⅛" in diameter. The largest expanded perlite particle does not exceed about ⅜" in diameter.

The perlite industry received its start toward the end of World War II. In the formative years of the perlite industry, three types of furnaces were developed for expanding the perlite ore to form expanded perlite particles. These three types of furnaces were the stationary horizontal furnace, rotary furnace, and vertical furnace.

The vertical furnace is by far the most popular design. The rotary furnace is next in popularity with the stationary horizontal furnace being third in popularity. The vertical furnace is capable of heating and expanding all gradations of ore. The rotary furnace works best on coarse ore. The horizontal stationary furnace is used on fine ores.

The vertical furnace comprises a vertical tube. A burner is placed at the bottom of the tube looking upwardly and a draft is provided by a fan downstairs from the vertical tube. The ore is dropped directly into the flame about midway of the tube. The particles fall down, downwardly, and due to the heat in the vertical tube, the particles are heated and start to expand. With expansion, the density of the particles decreases, and the rate of fall in the vertical furnace slows. Then, when the particles have expanded, sufficiently, the density of the particles decreases and the force of gravity on the particles is overcome by the upward draft in the furnace and the particles reverse their direction and exit out the top of the vertical furnace or vertical tube. These expanded particles are carried, pneumatically, to a collector, such as a cyclone or bag house and collected.

The rotary furnace is, essentially, a set of concentric cylinders that are set, horizontally, and rotate in the same manner as the rotary kiln. There are three cylinders, one inside the other. The ore is fed into the annular space between the inside cylinder and the center cylinder. The ore is preheated in this space. The preheated ore is then fed into the inside cylinder. This inside cylinder has a burner mounted in it that provides the heat. As the ore expands, the lighter expanded particles enter into the airstream passing through the furnace and are carried out of the furnace. The heavier particles are expanded into the expanded particles and put into the airstream at the end of the furnace. The expanded particles are collected in a fashion similar to that with a vertical furnace in that these particles can be collected in a cyclone or bag house.

The horizontal stationary furnace comprises a cylinder and has a burner to supply heat. The fine solid particles are introduced into this cylinder and heated to expand the fine particles. An airstream passes through the horizontal cylinder and the expanded particles, which have a low density, are carried out of the furnace in the airstream and collected in a bag house or a cyclone.

The source of heat or the source of heat energy is a gas, such as natural gas. This gas is burned to supply the heat energy which is used to expand the solid particles. There is also used liquified petroleum gas or a mixture of propane-butane. The quantity of heat energy required to heat a ton of solid perlite particles to form an expanded perlite particle is in the range of about 3 million to 4.5 million BTU's per ton. It is my understanding that with these three furnaces, viz., the rotary furnace, the horizontal stationary furnace, and the vertical furnace, that the products which can be heat treated are zeolite, vermiculite, and perlite, and products of that class. It is not possible to heat treat diatomaceous earth, clay, cement, fly ash, and titanium dioxide, for example, in the vertical furnace or the stationary horizontal furnace or the rotary furnace.

In these furnaces, it may be considered that two types of air are introduced. One type of air is for combustion purposes so that the fuel, such as a hydrocarbon gas, can be burned to give off heat energy. The second type of air can be considered to be an expansion air. The expansion air, along with the particles to be expanded, is heated to be able to carry away the expanded solid particles or the expanded perlite. Because of the necessity of heating the expansion air, a considerable amount of heat energy is used. The expansion air, at ambient temperature, enters into the furnace, is heated and the temperature elevated to that temperature in the furnace, and this heated expansion air used to carry away the expanded solid products and then the heated expansion air is exhausted to the atmosphere. In one manner of thinking, the heating of the expansion air is a waste of heat energy. As a result of my having worked with these furnaces and having worked in the industry for expanding zeolite, vermiculite, perlite, and the like, I have become familiar with the industry and consider that if a furnace could be devised to eliminate the expansion air, then the heat energy required to make the expanded solid particle would be reduced and there would be a saving in energy. Therefore, I have devised a furnace which can be used for expanding zeolite, vermiculite, perlite, and can process diatomaceous earth, clay, cement, fly ash, titanium dioxide, pumice, and the like, and which furnace uses, essentially, only air for burning the combustible fuel and does not require expansion air for carrying away the expanded solid particles.

THE GENERAL DESCRIPTION OF THE INVENTION

This invention comprises a furnace having two opposed sets of refractories. The refractory may be furnace brick. These refractories are arranged in two circular paths. There is a lower refractory in a circular path and an upper refractory in a circular path with the upper refractory being positioned above the lower refractory. There is a means for rotating one of these refractories. Generally, the lower refractory is rotated. Also, there is means for introducing solid particles onto the lower refractory so the solid particles can be heat treated and, in certain instances, expanded. Also, there is a means to remove the expanded solid particles from the lower refractory and from the furnace.

The refractory can be porous so that a gaseous fuel can pass through the refractory and burn near the surface of the refractory. The furnace requires, essentially, only combustible air for burning the combustible fuel. The furnace does not need expansion air as the expanded solid particle or the heat treated particle is not removed from the furnace by means of expansion air. The expanded solid particle or the heat treated particle is removed from the furnace, mainly, by force of gravity.

In certain instances, it is possible to use a solid fuel, such as coal, or to use a liquid fuel, such as fuel oil and to vaporize the liquid fuel prior to introducing it into the furnace.

With the furnace requiring, essentially, only combustible air for burning the combustible fuel, there is a saving in heat energy and fuel as it is not necessary to heat expansion air and fuel is not wasted in heating the expansion air.

THE OBJECTS AND ADVANTAGES

One of the objects and advantages of this invention is the provision of a furnace which is, relatively, small and compact for the quantity of product produced by the furnace; another important advantage is the provision of a furnace which, for a unit of product, uses less fuel than is used with the present, commercially, available furnaces for heat treating and expanding particles; another object is to provide a furnace which, as compared with commercially available furnaces, has a lower initial cost; an additional object is to provide a furnace which has a high output of product for a unit volume of the furnace; another object is to provide a furnace having refractories which are arranged in a circular pattern for ease of introducing raw material into the furnace and for ease of removal of the heat treated product from the furnace; a further object is to provide for a, relatively, short residence time in the furnace; to provide a furnace requiring a, relatively, small number of accessories; to provide a furnace which is capable of realizing a higher temperature than with a present commercially available furnace; to provide a furnace having opposed heating surfaces so that there is a beneficial effect from radiation; to provide a furnace with two sets of refractories and which refractories are opposed to each other and facing each other; to provide a furnace having a first refractory which is porous and permits fuel to flow through the refractory and burn in close proximity to said refractory; to provide a furnace having a second refractory which is heated by radiation from the fuel burning near said first refractory; to provide a furnace for utilizing incoming air for combustion purposes and to minimize incoming air needed for expansion purpose of expanded solid particles; to provide a furnace wherein the material in the furnace can be elevated from ambient temperature to about 2000° F. in, approximately, 5 minutes; to provide a furnace wherein the refractory rotates in a circle; to provide a furnace wherein the rotational speed of the refractory can be varied for accommodating raw material of different characteristics; to provide a furnace wherein the temperature in the furnace of, approximately, 2600° F. can be realized; to provide a furnace wherein raw material can be fed, continuously, to the furnace and also the product discharged, continuously, from the furnace; to provide a furnace wherein refractory brick of substantially the same characteristics are used; to provide a furnace wherein the ends and sides of the refractory brick are sealed to direct the flow of the gaseous fuel through the main part of the refractory brick; to provide a furnace wherein refractory brick is placed in a side-by-side relation and the space between adjacent refractory brick is sealed; to provide a furnace wherein the exposed surface of the refractory brick is coated with porous aluminum oxide; to provide a furnace wherein raw material can be expanded to make an aggregate for light-weight concrete; to provide a furnace requiring lower capital investment as less pollution controls are required; to provide a furnace which can accommodate various fuels such as a solid fuel, a liquid fuel, and a gaseous fuel; to provide a process where less air is used and less fuel used as compared with the commercially available processes for heat treating particles and for expanding particles; to provide a process for producing expanded particles of, comparatively, very large size; to provide a stronger expanded product than can be produced with, presently, commercially, available processes in that the expanded product can be annealed; to provide a process for making a shielded encapsulated radioactive material; to expand larger particles to make strong expanded particles which were not, previously, commercially possible as large expanded particles were soft; to expand large particles without suspending the large particles in air; to expand small particles and to collect the expanded particles in a gaseous stream; to expand particles without the necessity of drying the particles to a moisture content of less than about 1% moisture; to expand particles of the moisture content up to about 10% moisture; to provide a process wherein there is a variable residence time to heat treat solid particles and to accommodate solid particles with different characteristics; to process a radioactive material and particles and to encapsulate said radioactive material in a particle to store in a safe manner; to process radioactive salt cake with particles to encapsulate said radioactive salt cake and particles; to process said encapsulated radioactive salt cake so as to retrieve the radioactive material; to process radioactive salt cake with particles to encapsulate the radioactive salt cake and to shield the radioactive material; to process the shielded radioactive salt cake so as to retrieve the radioactive material; to process solid particles to make an expanded solid particle to be used as a light weight aggregate in concrete; to heat treat solid particles which, prior to my invention, could not be heat treated; to process radioactive material so as to make the material into a form which is not leachable and which form is easier to store; to agglomerate small particles into larger particles so as to achieve a more precise control of bed thickness in a furnace and to realize a faster and more efficient heat transfer to the agglomerated larger particles; to process waste material to make useful products; to agglomerate fines and to process said agglomerated fine to make useful products; and, to heat treat and also to expand particles with various fuels such as a solid fuel, a liquid fuel, and a gaseous fuel.

These and other important objects and advantages of the invention will be more particularly brought forth upon reference to the detailed description of the invention, the appended claims and the accompanying drawings.

THE DRAWINGS

FIG. 1 is a fragmentary, side elevational view of a specific embodiment of the invention and illustrates the distribution system for the fuel and the refractory in the furnace area;

FIG. 2, taken on line 2—2 of FIG. 1, is a fragmentary plan view of the lower refractory in the furnace;

FIG. 3, taken on line 3—3 of FIG. 1, is a fragmentary plan view of the upper refractory in the furnace;

FIG. 4 is a fragmentary plan view illustrating the lower refractory in the furnace, the feeding mechanism for introducing raw material into the furnace, and the discharge mechanism for discharging expanded product from the furnace;

FIG. 5, taken on line 5—5 of FIG. 4, is a fragmentary cross-sectional, side elevational view looking into the lower refractory of the furnace;

FIG. 6, taken on line 6—6 of FIG. 4, is a lateral cross-sectional view showing the lower refractory, the support structure for the lower refractory, and the distribution system for the fuel in the furnace;

Figure 9:
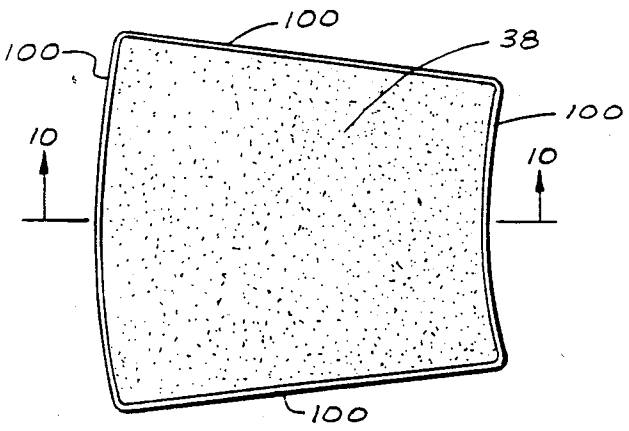
FIG. 9 is a plan view looking at one of the refractory bricks and showing the sealing of the sides and ends of the refractory bricks.
Figure 10:
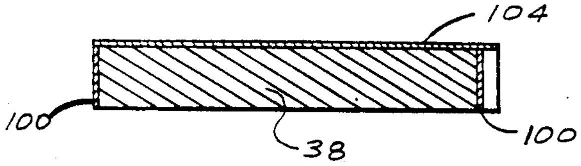
Figure 11:
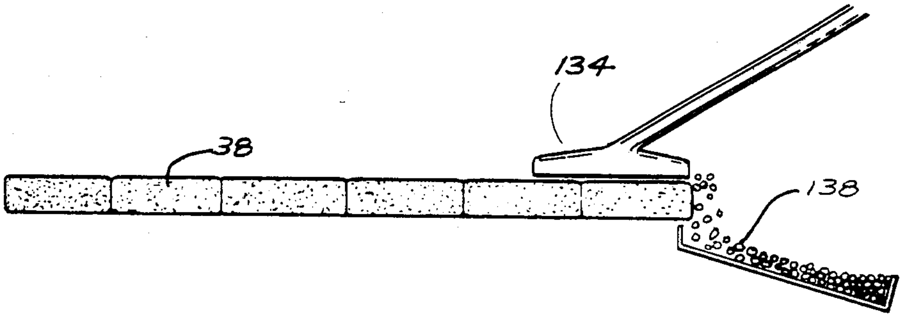
Figure 12:
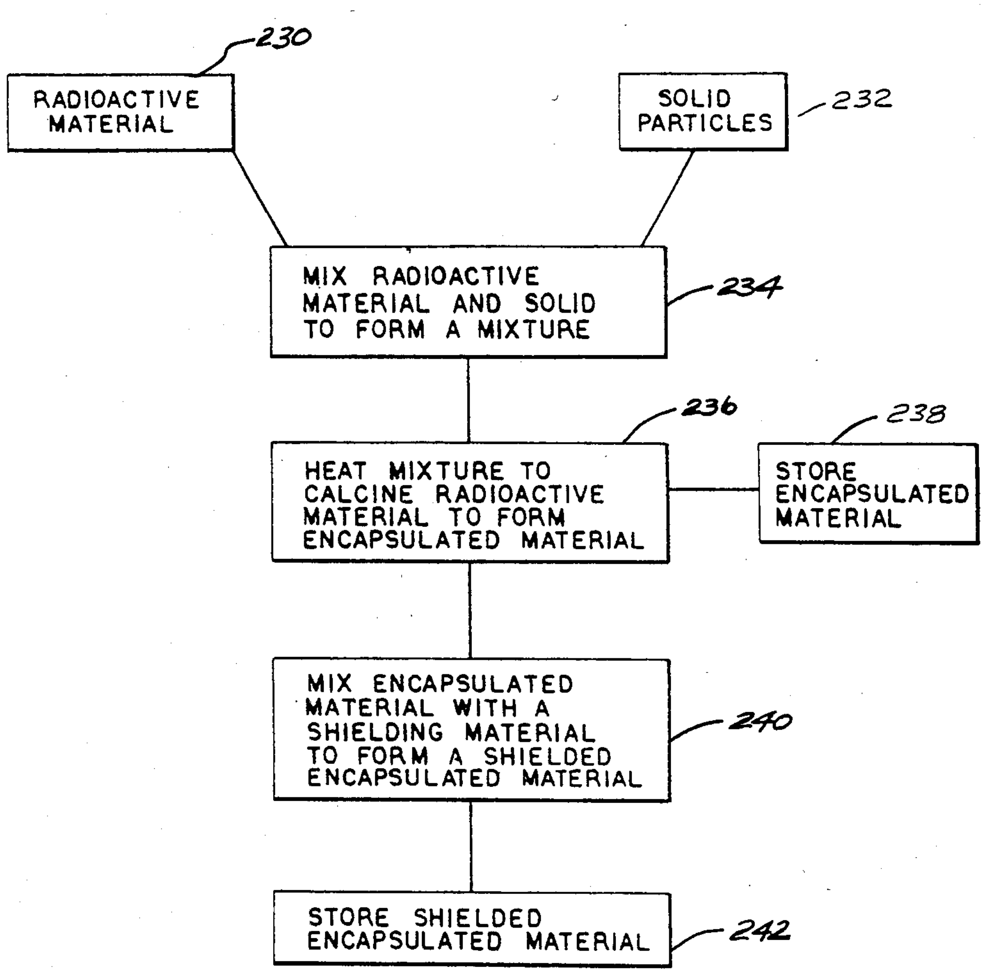
Figure 13:
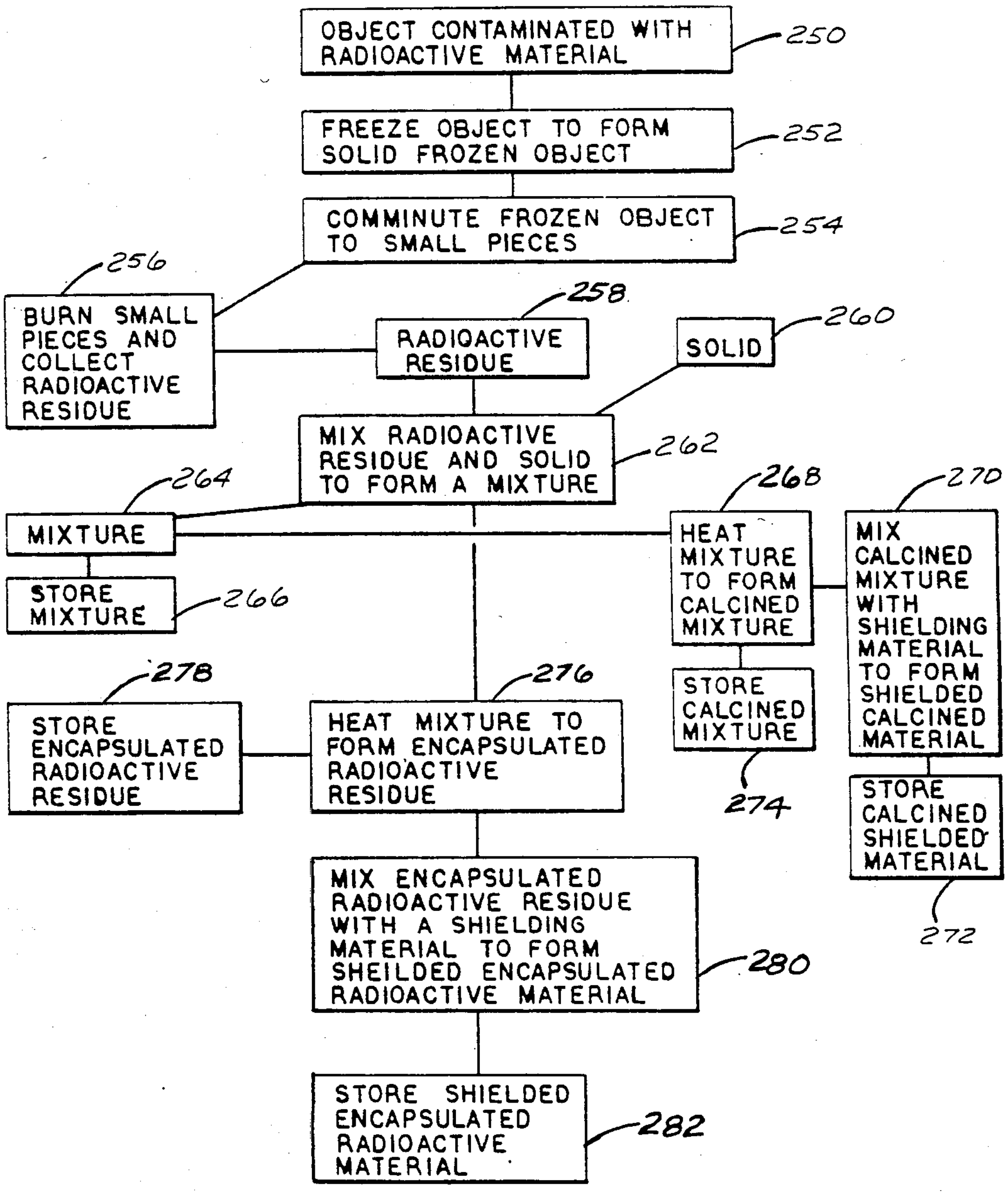
Figure 14:
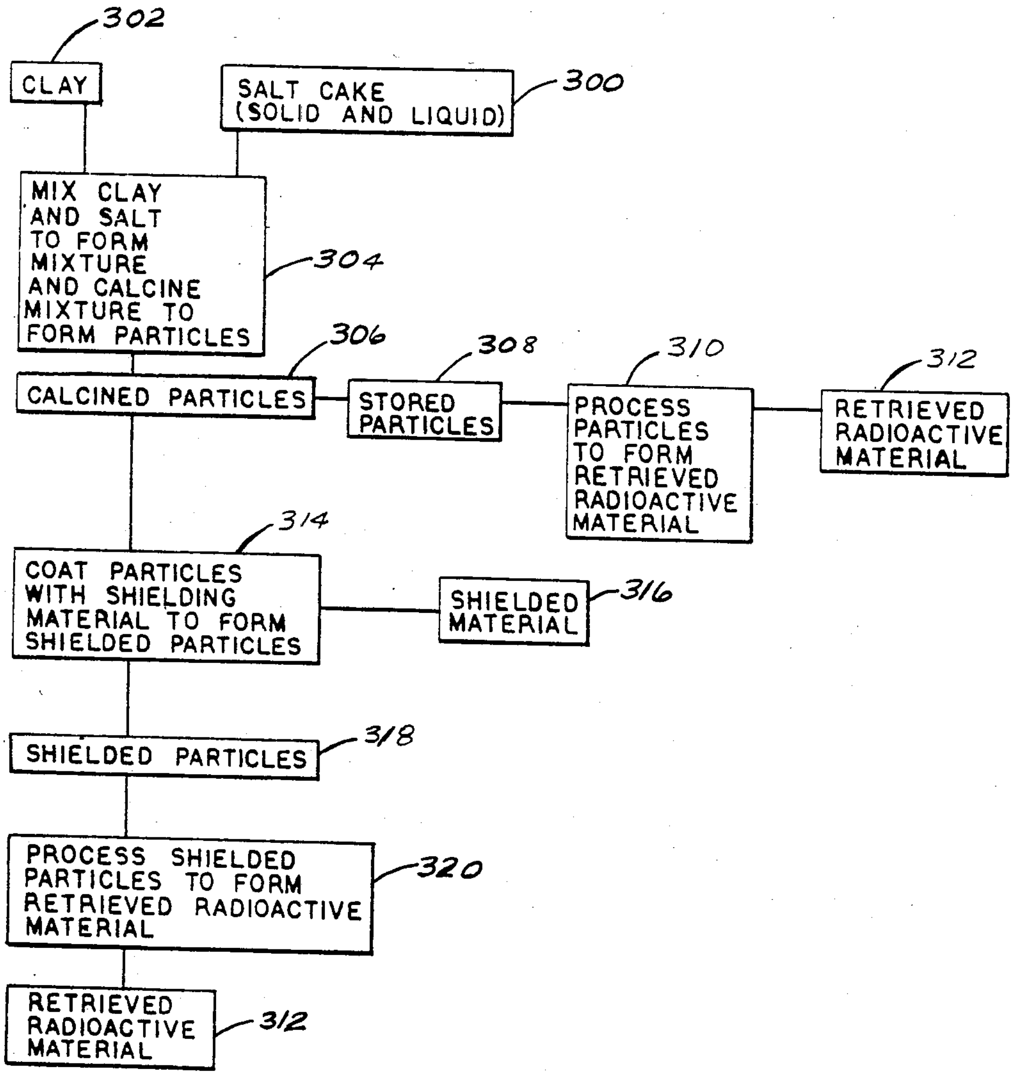
Figure 15:
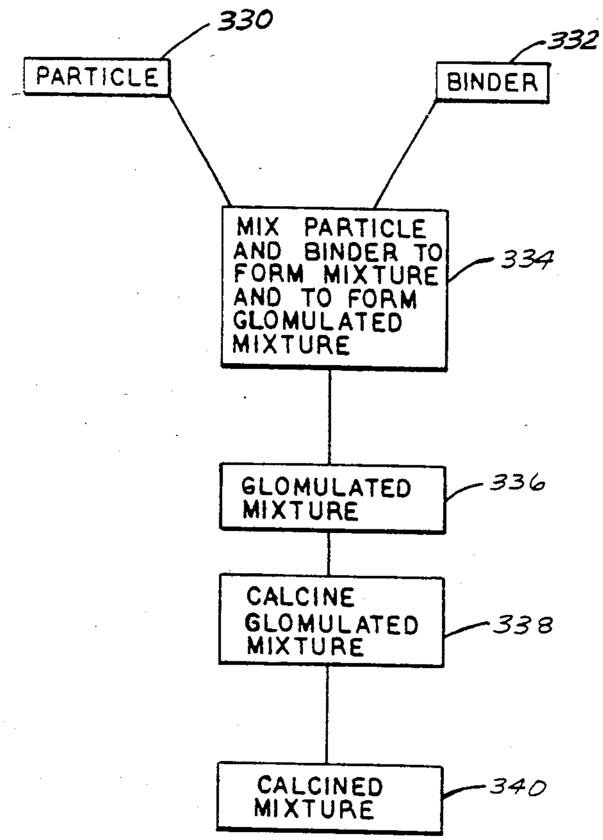
Figure 16:
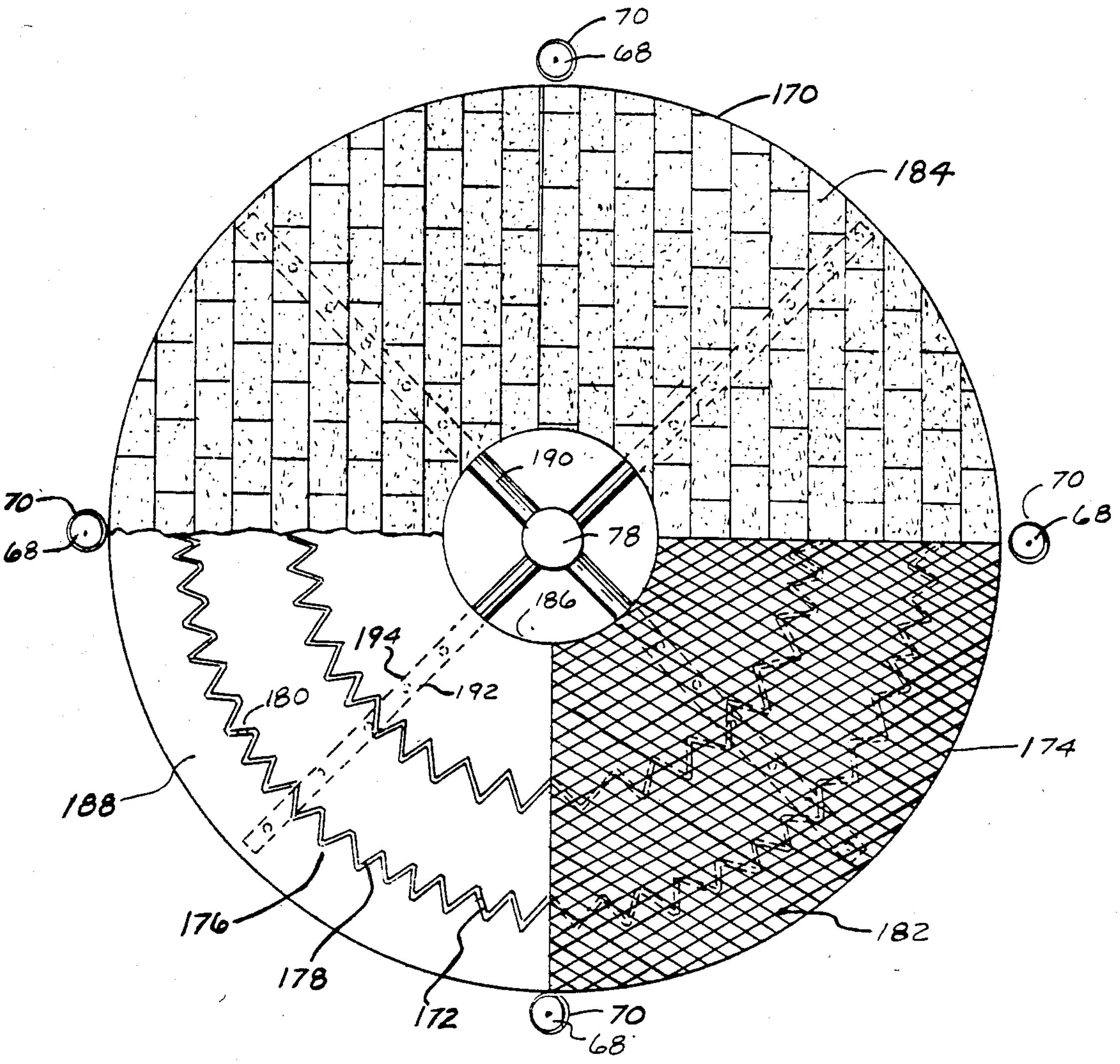
Figure 17:
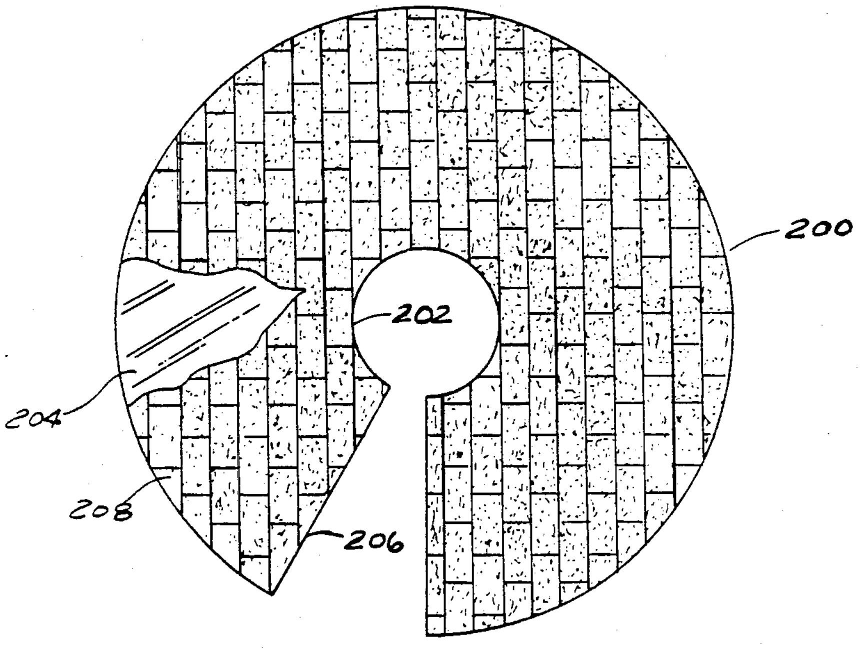
Figure 18:
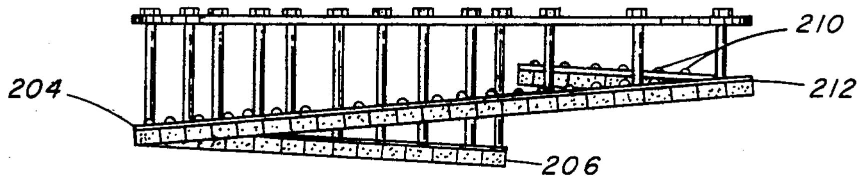
Figure 19:
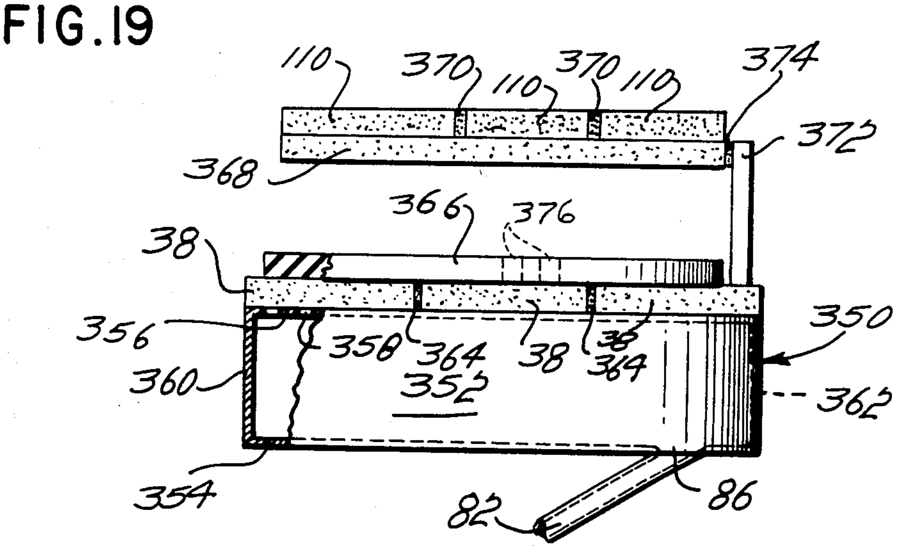
Figure 20:
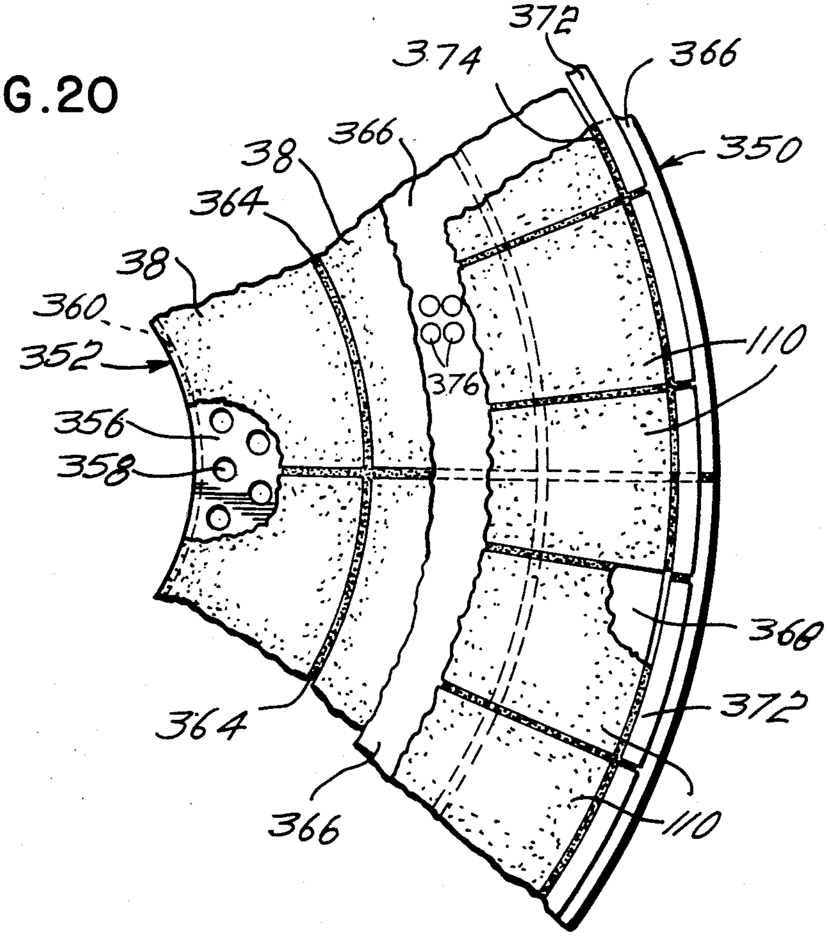
Figure 21:
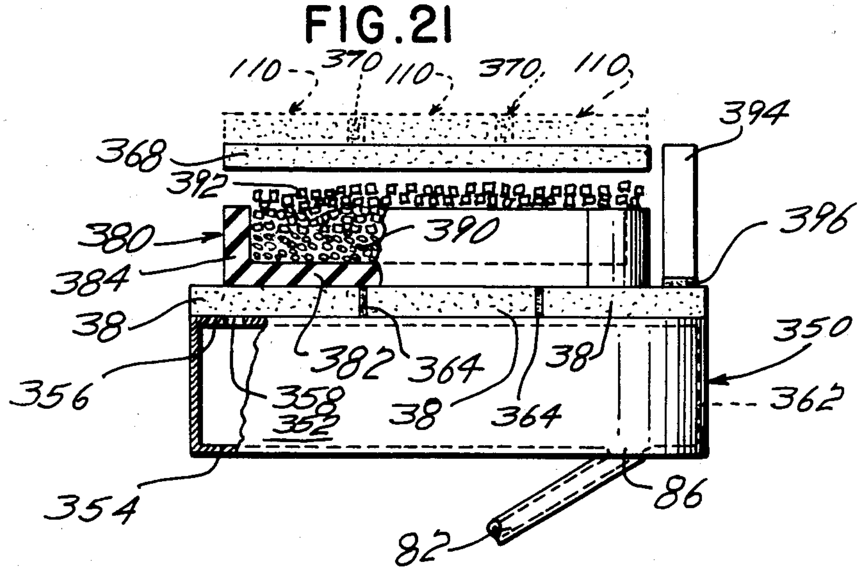
Figure 22:
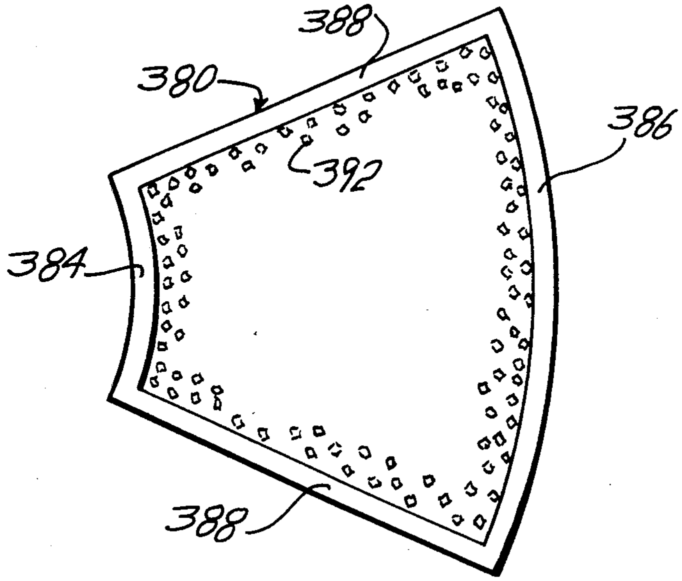
Figure 23:
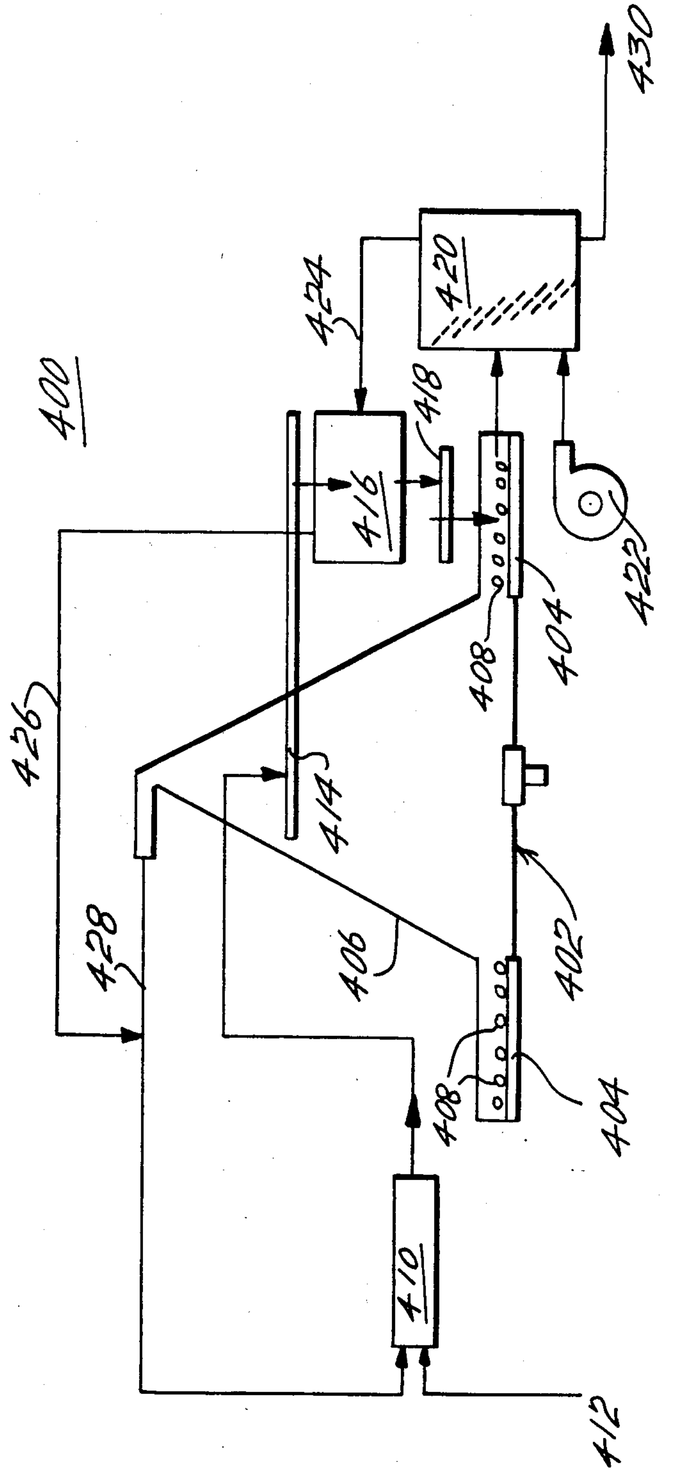
Figure 24:
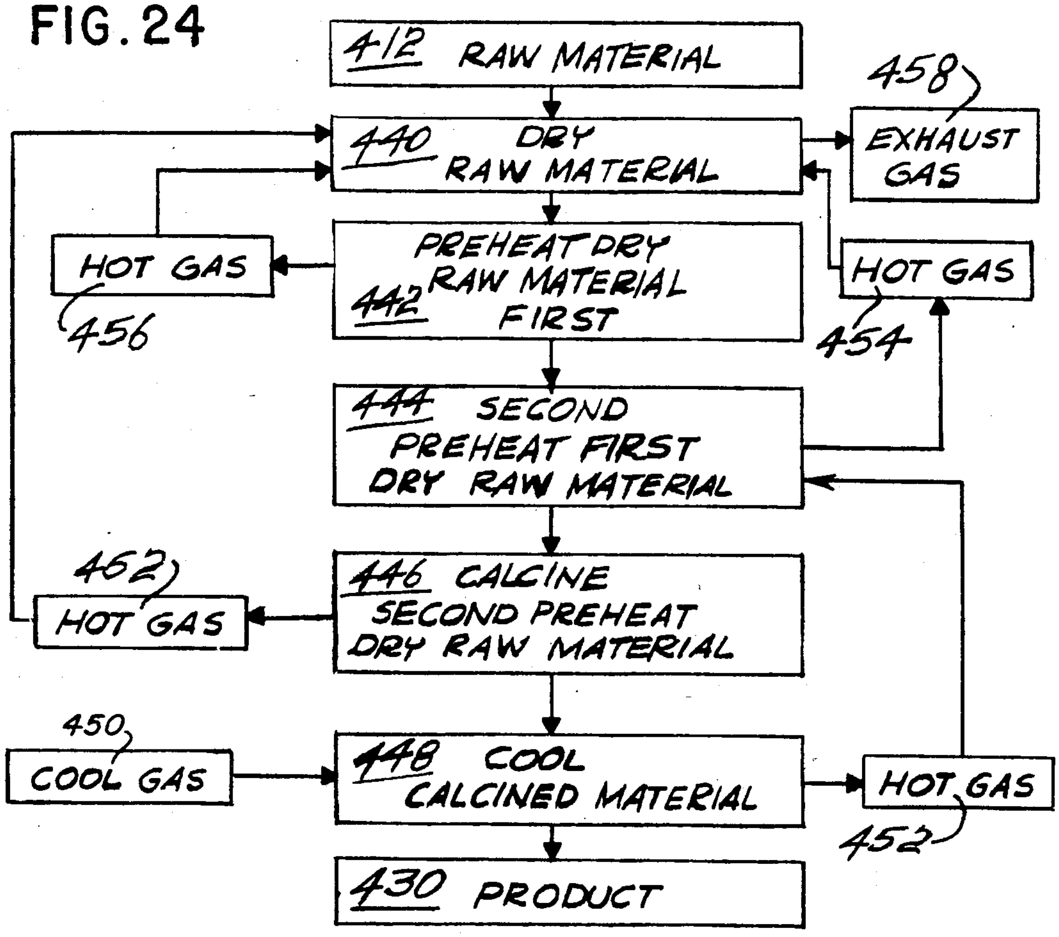
Figure 25:
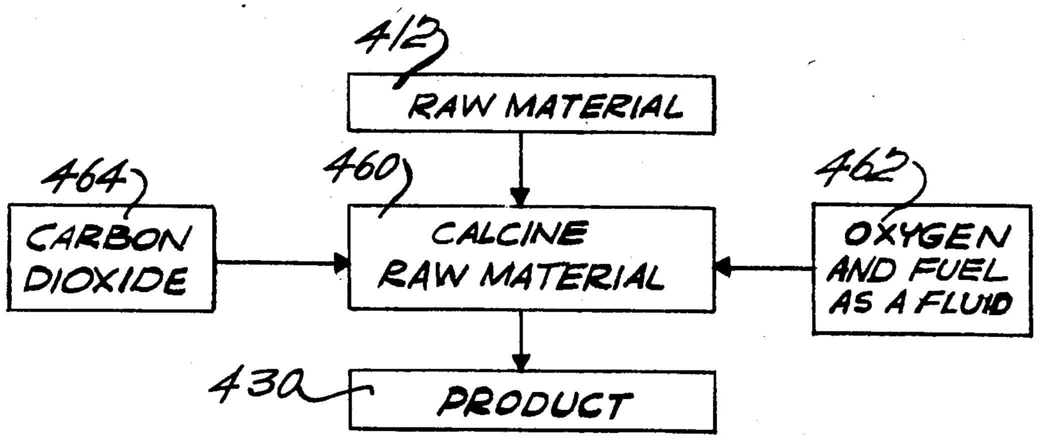
Figure 26:
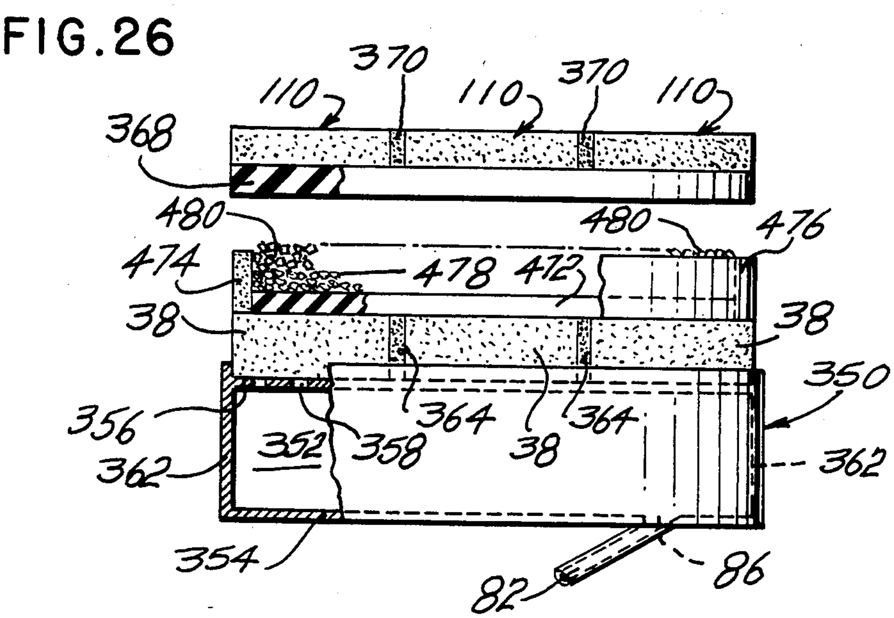
Figure 27:
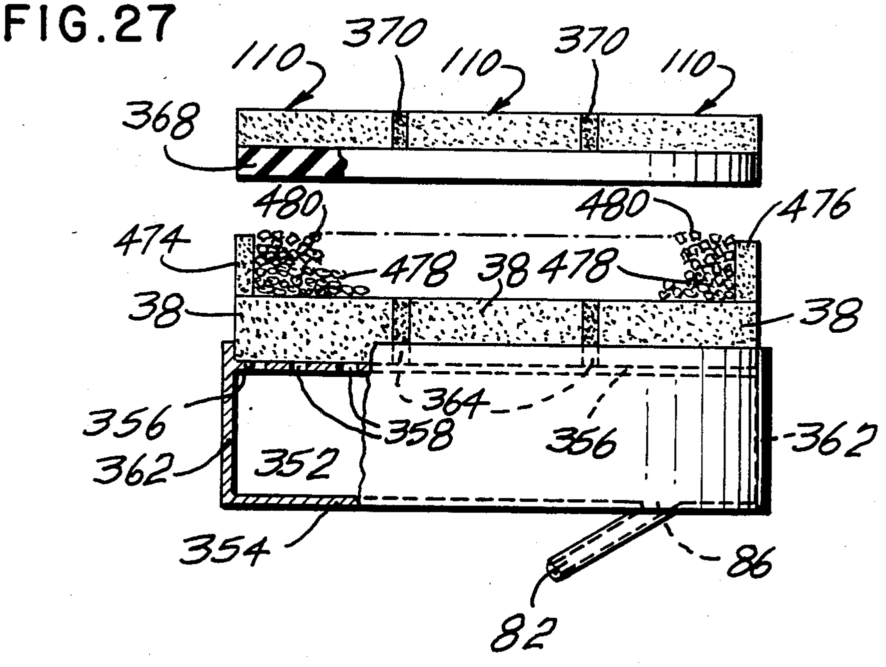
Figure 28:
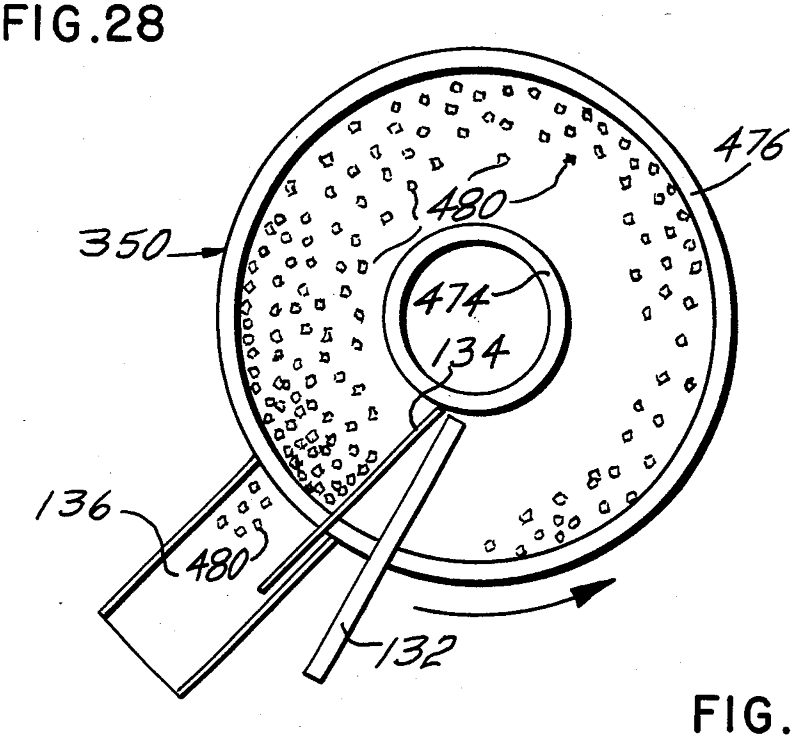
Figure 29:
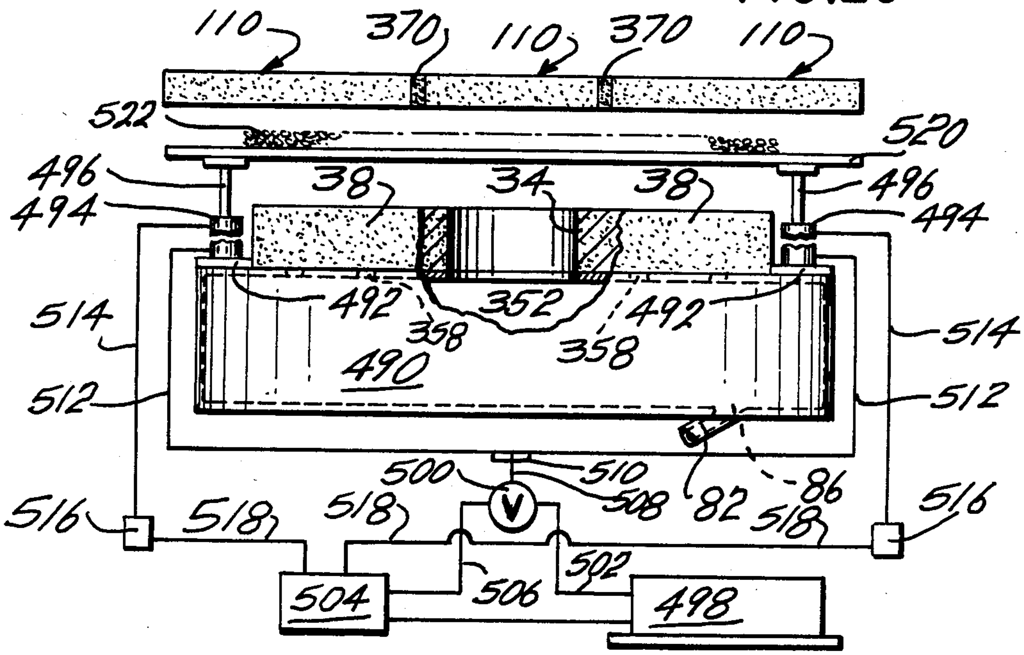

FIG. 10, taken on line 10—10 of FIG. 9, is a vertical cross-sectional view illustrating a refractory brick;

FIG. 11 is a fragmentary elevational view illustrating the doctor blade for removing the expanded solid particles from the furnace;

FIG. 12 is a schematic outline of a process for mixing radioactive material and solid particles to form a mixture and then heating the mixture to encapsulate the radioactive material and then to treat the encapsulated radioactive material with a shielding material;

FIG. 13 is a schematic outline of a process for treating material contaminated with a radioactive material so as to be able to store the contaminated radioactive material;

FIG. 14 is a schematic outline of a process for treating radioactive salt cake with a carrier so as to be able to store the radioactive salt cake, also for being able to retrieve radioactive materials from the salt cake;

FIG. 15 is a schematic outline of a process for treating a particle with a binder so as to be able to agglomerate the particle and binder and then heat treat the particle and binder to form a heat treated product;

FIG. 16 is a fragmentary view looking at the construction of another form of the circular member comprising firebrick and illustrates the supporting structure for the firebrick and the means for distributing fuel to the firebrick;

FIG. 17 is a view illustrating the circular member comprising reflector brick;

FIG. 18 is a side elevational view of a spiral circular member comprising reflector brick;

FIG. 19 is a fragmentary side elevational view of another species of the invention illustrating part of the plenum chamber, a pipe for carrying a mixture of air and natural gas, a grate for supporting porous firebrick, porous ceramic mat on top of the firebrick, a reflector positioned above the porous ceramic mat and an outer ceramic seal;

FIG. 20 is a fragmentary top plan view showing the structure of FIG. 19;

FIG. 21 is a fragmentary side elevational view of an additional species of the invention illustrating the plenum chamber, the pipe for carrying a mixture of air and natural gas to the plenum chamber, a grate, a porous firebrick on top of the grate, a porous ceramic trowel for holding a bed on material, and the raw material to be calcined on said bed of material, reflector brick and an upright outer ceramic seal;

FIG. 22 is a top plan view of the ceramic trowel for holding the bed of material and the raw material to be calcined;

FIG. 23 is a schematic illustration of a calcining operation utilizing a furnace according to this invention and for utilizing the exhaust gases to heat incoming raw material;

FIG. 24 is a flow sheet illustrating a process for calcining a raw material and utilizing the hot exhaust gas to dry the raw material prior to the calcining operations;

FIG. 25 is a flow sheet illustrating a process for calcining a raw material and for the utilization of carbon dioxide and a mixture of oxygen and fuel as a source of heat energy;

FIG. 26 is a fragmentary side elevational view of an additional species of the invention illustrating the plenum chamber, the pipe for carrying a mixture of air and flammable gas to the plenum chamber, a grate, a porous fire brick on top of the grate, a porous ceramic fiber board on top of the fire brick for holding a bed of loose particles, and the material to be heated on said bed of loose particles;

FIG. 27 is a fragmentary side elevational view of an additional species of the invention illustrating the plenum chamber, the pipe for carrying a mixture of air and flammable gas to the plenum chamber, a grate, a porous fire brick on top of the grate, a bed of loose particles on the porous fire brick and the material to be heated on said bed of loose particles;

FIG. 28 is a plan view looking down on the circular furnace, which is in the configuration of a torus, the bed of material to be heated on top of the bed of loose particles, and illustrates the einner and outer refractory edges, the doctor blade, the chute or conveyor for loading the material to be heated onto the bead of loose particles and also the chute for taking the material after it has been heated from the furnace; and, FIG. 29 is a schematic side elevational view of the burner and shows adjustable support means for an intermediate plate between the fire brick and the reflector brick so that said adjustable support means can vary the distance between the intermediate plate and the fire brick and also illustrates material to be heated on the upper surface of the intermediate plate.

THE SPECIFIC DESCRIPTION OF THE INVENTION

One part of this invention comprises a furnace for heating a material to form a heated product and/or an expanded or bloated product. The furnace comprises a first circular member 30 and a second circular member 32.

Figure 2:
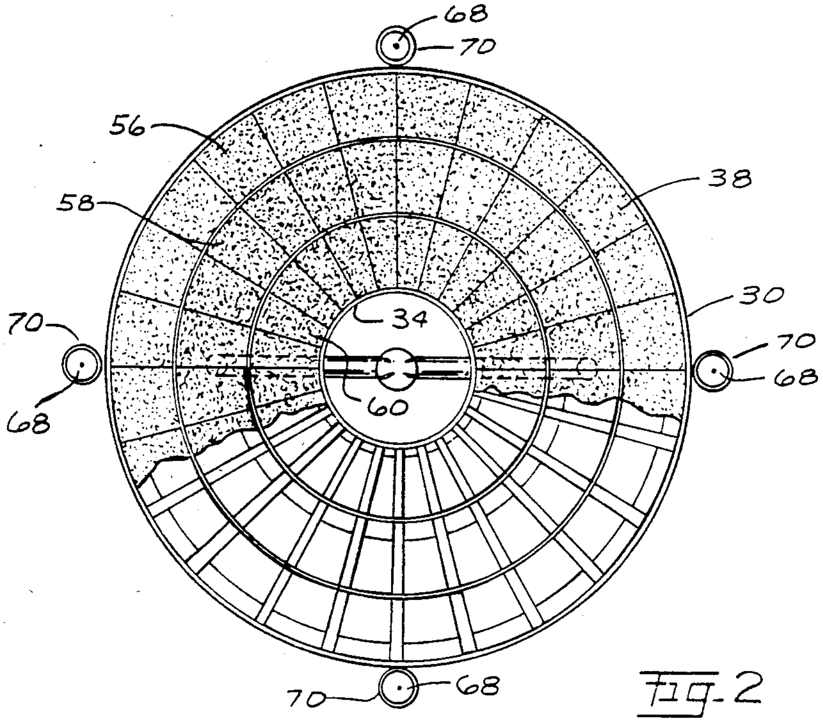

In FIG. 2, it is seen that the first circular member 30 is in the configuration of a torus having a central opening or passageway 34.

Figure 3:
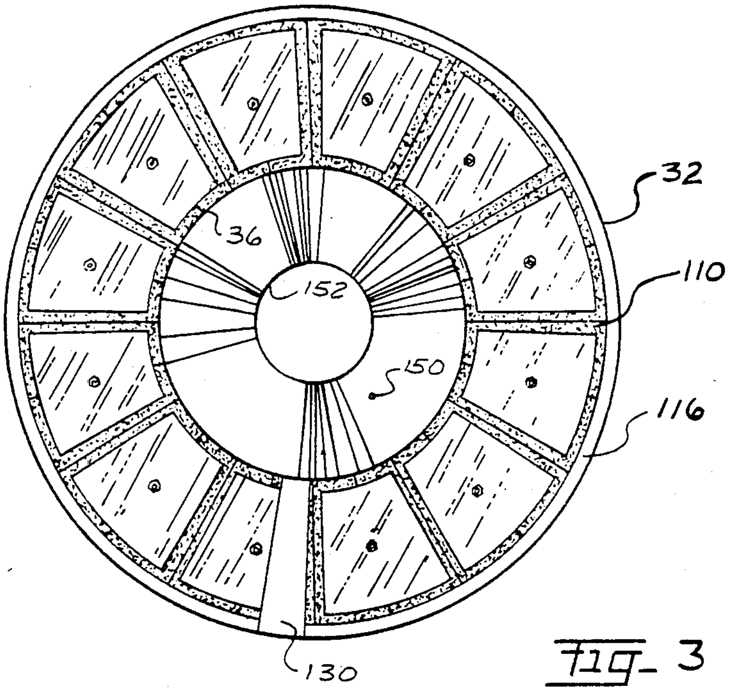

In FIG. 3, it is seen that the second circular member 32 is in the configuration of a torus having a central opening or passageway 36.

Figure 1:
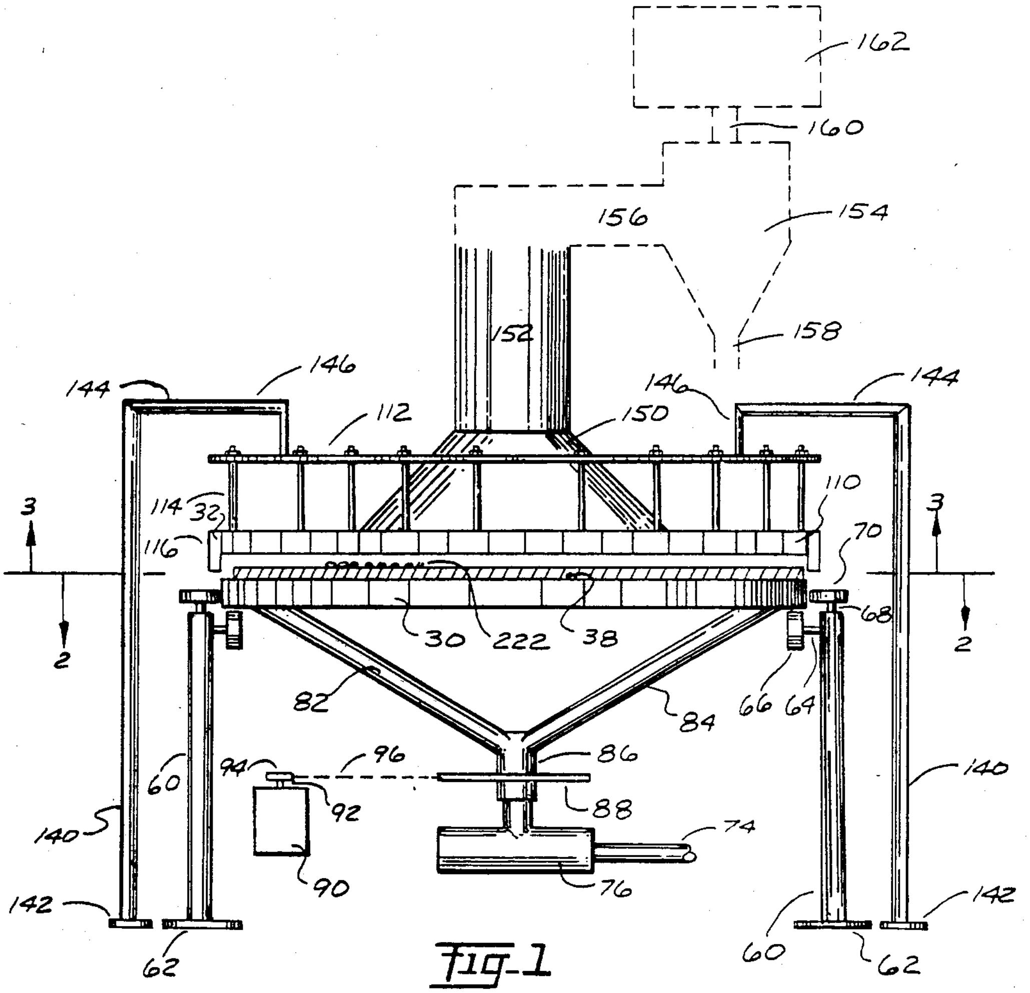

In FIG. 1, it is seen that the first circular member 30 is positioned below the second circular member 32. The first circular member 30 can rotate and the second circular member 32 can be stationary.

The first circular member 30 comprises a plenum chamber and also a support for fire brick 38.

Figure 6:
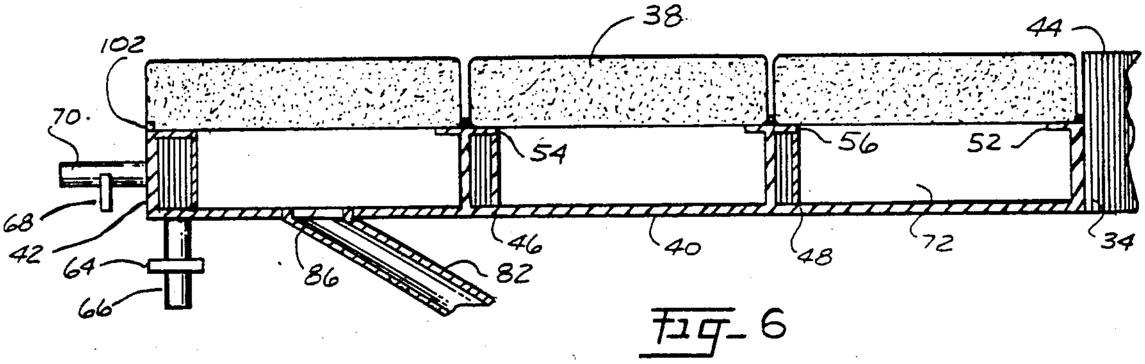

In FIG. 6, there is illustrated the support structure for the fire brick 38 of the first circular member 30. It is seen that there is a bottom support plate 40 in the configuration of a torus. Then, there is an outer circular wall 42. There is also an inner circular wall 44 defining the opening 34. Also, there are two in-between circular wall supports 46 near the wall 42 and 48 near the wall 34. Projecting inwardly on the upper part of the wall 42 is a support ledge 50. And, projecting inwardly of the wall 44 is a support ledge 52. Then, on the upper part of the wall 46 is a support ledge 54 and on the upper part of the wall 48 is a support ledge 56. The firebrick 38 rests on the support ledges. In FIG. 2, it is seen that there are three circular courses of brick. There is an outer circular course of brick 56, a middle course of brick 58, and an inner circular course of brick 60.

In FIG. 2, it is seen that the firebrick 38, in a plan view, are in the figure of the frustum of a trapezoid. The firebrick in the outer course 76 are larger in size than the first brick in the middle course 58. The firebrick in the middle course 58 are of a larger size than the firebrick in the inner course 60. It is to be under stood that a furnace may have only one course of firebrick or may have a large number of courses of firebrick. For illustrative purposes, there is illustrated in the first circular member 30 three courses of firebrick.

There are four upright pedestals 60, spaced at 90° with respect to each other. Each of the pedestals 60 has a supporting foot 62. Also, on the upper end of each of the pedestals 60, there is an inwardly directed shaft 64 and a roller 66 is positioned on the shaft. In FIGS. 1 and 6, it is seen that the bottom support plate 40 rests on the rollers 66 and that the first circular chamber 30 can rotate on these rollers 66. Further, on the upper part of the upright pedestals 60, there is an upwardly directed shaft 68. There is positioned on the upwardly directed shaft 68 a roller 70. In FIGS. 1, 2, and 6, it is seen that the outer circular wall 42 is positioned between the four rollers 70. The first circular member 30 can rotate between the rollers 70 and can be positioned by these rollers 70.

In FIGS. 1, 2, and 6, there is illustrated a feed system for feeding an air-combustible gas mixture, such as propane or butane, to the plenum chamber of the first circular member 30. In FIG. 6, the plenum chamber is identified by reference numeral 72.

There is an inlet pipe 74 connecting with a mixing chamber 76. The mixing chamber 76 has an outlet nozzle 78.

There is an adapter 80 which fits over the outlet nozzle 78. The adapter connects with two arms 82 and 84. In FIG. 6, it is seen that the arm 82 connects with an opening 86 in the bottom support plate 40. Likewise, the arm 84 connects with another opening in the bottom support plate 40. The arms 82 and 84 are welded to the bottom support plate 40.

There is attached to the adapter 80 a sprocket 88. Also, positioned near the mixing chamber 76 is a motor and variable drive gear box 90 having outlet shaft 92. On the outlet shaft 92, is a sprocket 94. A chain 96 connects the sprocket 88 and the sprocket 94. With the actuation of the motor and variable drive gear box 90, the sprocket 94, the chain 96, and the sprocket 88 move so as to rotate the adapter 80 and the arms 82 and 84 and the first circular member 90.

With the rotation of the sprocket 88 and, correspondingly, the first circular member 30, the material placed on the firebrick also rotates.

The firebrick 38 is a porous brick and allows the mixture of air an combustible gas to pass from the plenum chamber and through the interstices of the brick to the surface of the brick. From experience, I have found that the ends and sides of the firebrick 38 should be painted with a "temperature resistant" paint or a fireproof paint 100. This paint is impervious to the flow of the air-combustible gas mixture and thereby restricts the flow of the air-combustible gas mixture to passing through the brick. In placing the brick 38 on the support ledges, there is used a silicone sealant 102 to seal between the surface of the brick and the surface of the ledge.

The firebrick may be one of many suitable bricks, such as K30 B and W. There may be placed on top of the firebrick, a layer 104 of aluminum oxide or silicon carbide. The porosity of the layer 104 of aluminum oxide or silicon carbide is of the same porosity as of the firebrick 38. The layer 104 is harder than the firebrick 38 so as to resist abrasion. Further, I consider that it is desirable that the firebrick 38 be as uniform as possible with respect to dimension and with respect to weight. It is possible within a narrow tolerance range to have the firebrick 38 in a course of the same general dimensions with respect to length, width, and thickness and also the same general porosity. Naturally, the firebrick 38 will vary in dimensions from one course to another course but in the same course, the firebrick should be of the same general characteristics.

The second circular member 32 comprises a number of refractory brick 110 positioned above the firebrick 38 of the first circular member 30. In FIG. 1, it is seen that there is an upper circular ring 112. The refractory brick 110 are suspended from the ring 112 by means of bolts 114. In FIG. 1, it is seen that the spacing between the refractory brick 110 and the firebrick 38 remains constant.

In FIG. 1, it is seen that on the outside of the refractory brick 110 and the second circular member 32 that there is a depending circular rim 116. The depending circular rim 116 assists in maintaining the material being processed between the firebrick 38 and the refractory brick 110.

Figure 7:
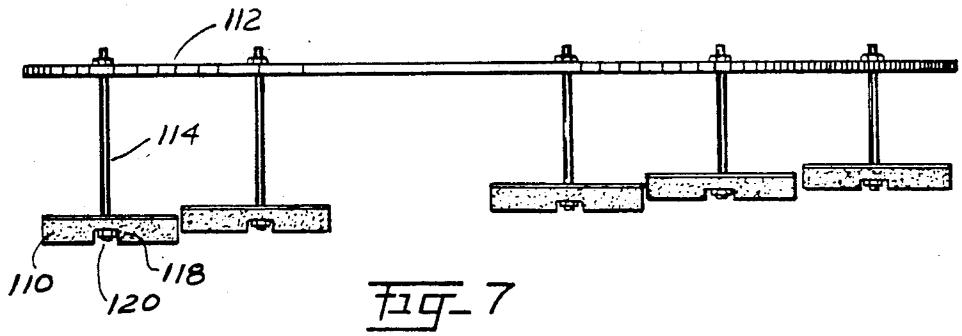
FIG. 7 is a fragmentary elevational view illustrating one manner for positioning upper refractory on a ring in the furnace.

In FIG. 7, there is illustrated the upper circular ring 112 and bolts 114 connecting with the refractory brick 110. In FIG. 7, it is seen that the length of the bolts 114 vary so as to have some of the refractory brick 110 farther away from the ring 114 than other refractory brick. The result is that some of the refractory brick 110 are closer to the firebrick 38. The reason for this is that when the material to be processed is initially placed on the firebrick 38, it is of a, relatively, small volume. After a while, this material expands into a larger volume and in order to accommodate the larger volume, the refractory brick 110 must be positioned farther away from the firebrick 38. In FIG. 7, it is seen that the refractory brick 110 have a recess 118. There is a nut 120 screwed onto the threaded end of the bolt 114 and in said recess 118.

Figure 8:
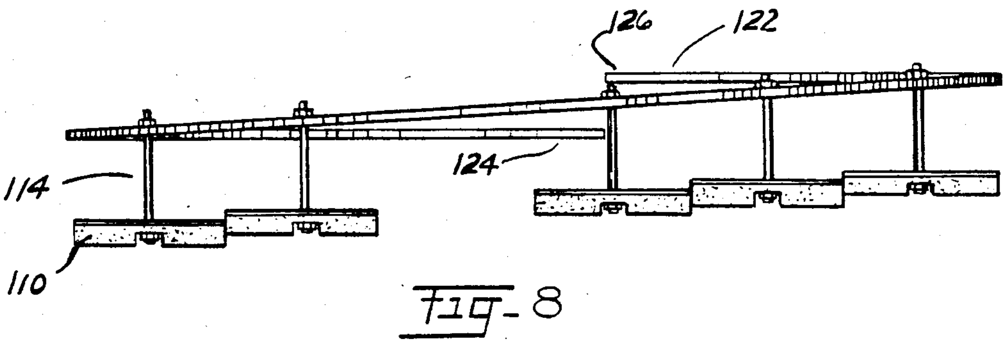
FIG. 8 is a fragmentary elevational view illustrating another manner for positioning the upper refractory on a spiral ring in the furnace.

In FIG. 8, there is illustrated a split upper ring 122. The split upper ring is in the form of a spiral having a lower end 124 and a upper end 126. A number of bolts 114 connect with the ring 122 and also connect with and support the refractory brick 110. In FIG. 8, the bolts 114 can be of, substantially, the same length even though some of the refractory brick 110 are positioned closer to the firebrick 38 than some of the other refractory brick 110. Again, the spacing of the refractory brick 110 with respect to the firebrick 38 is to accommodate the various size and volume of the material being processed.

Figure 4:
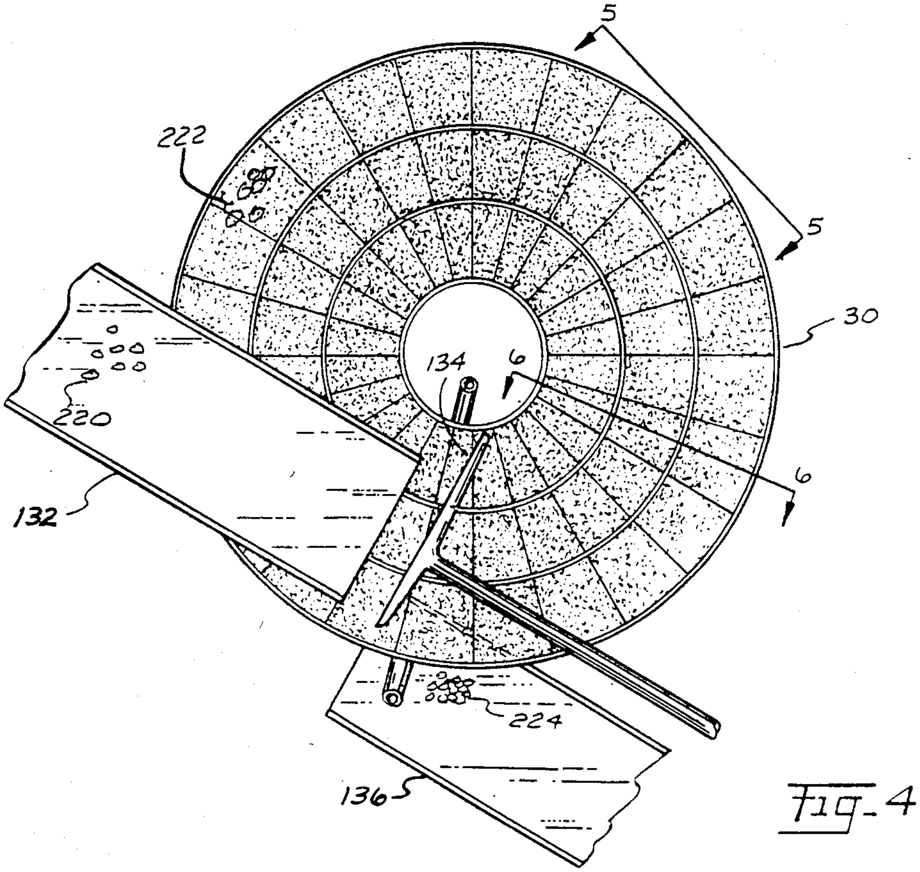
Figure 5:
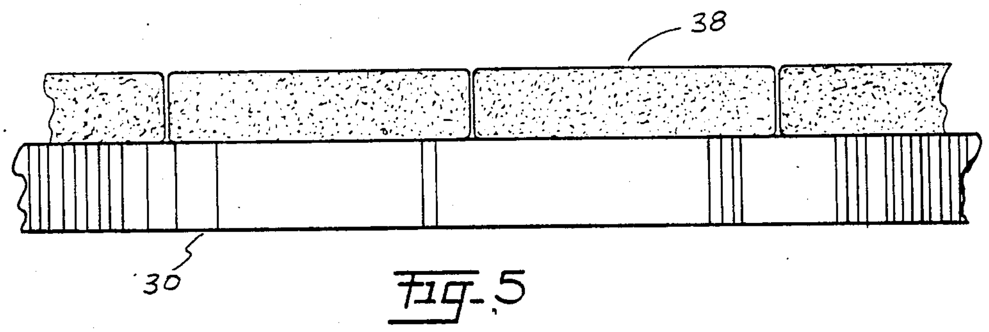

In FIG. 3, it is seen that there is a void 130 between two adjacent refractory brick 110 so as to allow material to be introduced between the second circular member 32 and the first circular member 30. This is more clearly illustrated in FIG. 4 wherein it is seen that there is a chute 132 or conveyor 132 for introducing product onto the firebrick 38. It is to be remembered that the lower circular member 30 and the firebrick 38 rotate while the upper circular member 32 and the refractory brick 110 are stationary or do not rotate. With the opening of void 130 in the upper circular member 32, the material to be processed can be introduced by means of the chute 132 so as to fall onto the firebrick 38. In FIG. 4, it is seen that the lower circular member 30 rotates in a clockwise direction. Also, in FIG. 4, it is seen that there is a doctor blade 134. The doctor blade extends to the outer edge or periphery of the lower circular member 30 so as to cause the processed material to flow toward the periphery of the member 30. There is positioned, partially, under the member 30 a sloping conveyor or chute 136. The material which has been processed is forced by the doctor blade to fall onto the chute 136 and be removed from between the firebrick 38 and the refractory brick 110.

In FIG. 7, it is seen that there is an opening 130 between the adjacent refractory brick 110 attached to the circular ring 112. Likewise, in FIG. 8, it is seen that there is an opening 130 between firebrick 110 attached to the split circular ring 122. The openings 130 illustrated in FIGS. 7 and 8 make it possible to introduce the material to be processed onto the firebrick 38 of the lower circular member 30.

In FIG. 11, there is illustrated the doctor blade 134 positioned above the firebrick 38 and positioned so as to drop the product 138 onto the sloping conveyor 136.

In FIGS. 1 and 2, it is seen that there are spaced apart pedestals 140, on the outside of the upright pedestal 60. On the lower part of the pedestal 140, there is a foot 142. On the upper part of the pedestals 140, there is a flange or arm 144. There depends from the flange or arm 144 a support 146, such as a bolt or a rod. The bolt or rod 146 also connects with the upper circular 112 or the split ring 122 so as to support the ring and the refractory brick 110 above the firebrick 38.

In FIGS. 1 and 3, there is illustrated an exhaust system for the products of combustion and, possibly, some of the resulting product from the process. In FIGS. 1 and 3, it is seen that there is a hood 150 positioned above the opening 36 in the upper circular member 32. The hood 150 connects with the exhaust pipe 152. It is possible to exhaust the gases from the furnace 28 through the exhaust pipe 152 and into the atmosphere. Sometime, it may be desirable to separate entrained solids in the exhaust gases. Therefore, there is illustrated in FIG. 1, in broken line or phantom line, a cyclone 154 which connects with the exhaust pipe 152 by means of an inlet pipe 156. The cyclone 154 has a lower exhaust pipe 158. On the upper end of the cyclone 154, there is a motor-van-passageway 160 for directing the exhaust gases from the cyclone 154 and into a bag house 162. It is seen that some of the solid particles in the exhaust gases are separated in the cyclone 154 and flow out of the cyclone through the exhaust 158. Also, the gases which flow from the cyclone 154 into the bag house 162 can flow out of the bag house. The bag house will remove the small particulate solids in the exhaust gases.

In FIG. 16, there is illustrated another species of a lower circular member 170. It is seen that this species comprises a bottom support plate 172 surrounded by an upwardly directed circumscribing rim 174. Further, it is seen that positioned on the lower support plate 172 are a number of flat bars 176 having bends 178. These flat bars can be positioned on edge on the plate 172. In the zigzag flat bars 178, there may be passageways 180.

There is positioned on top of the zigzag bars 178, expanded metal 182. Then, there is positioned on top of the expanded metal 182, firebrick 184. The firebrick 184 may have the sides and ends painted with a high temperature fire resistant paint so as to seal the firebrick. Further, the tops of the firebrick 184 may be coated with a block of aluminum oxide or silicon carbide of substantially the same porosity as the firebrick 184. The reader is to understand that the firebrick 184 are porous and that the mixture of air and combustible gas can pass through the porous firebrick 184 and also the coating of aluminum oxide or silicon carbide so as to be able to burn on top of the firebrick 184. It is to be understood that that part of the lower circular member 170 between the lower plate 172, the outer circumscribing rim 174, the inner circumscribing rim 186, and the lower part of the firebrick 184 is a plenum chamber 188. There can be introduced into the plenum chamber 188, the air and combustible gas mixture. To introduce the air and combustible gas mixture into the plenum chamber 188, there are four arms 190 connecting with the outlet nozzle 78 of the mixing chamber 76. The four arms 190 may be square tubes. In the lower plate 172, there are a number of openings 192. Aligned with the openings 192 in the plate 172 are openings 194 in the tubes 190. The tubes 190 can be welded to the lower plate 172 so as to form a rigid structure with the openings 192 and the openings 194 aligned for introducing the air-combustible gas mixture into the plenum chamber. Again, it is to be realized that the lower circular member 170 rotates as does the lower circular member 30 as, previously, explained in a foregoing part of this written description.

One of the advantages of the lower circular member 170 is the firebrick 184 need not be cut into a trapezoidal configuration. There is a saving in time and money by using standard fire brick 184. The firebrick 184 are supported on the expanded metal 182 which, in turn, is supported on the lower support plate 172. The lower support plate 172 is supported by the rollers 66, see FIG. 1, and the description of the rollers 66. Further, the lower circular member 170 is prevented from a sideways motion by the rollers 70 positioned on the upright pedestal 60.

In FIGS. 17 and 18, there is illustrated an upper circular member 200 having a central opening 202. The upper central member 200 comprises sheet metal 204 in the configuration of a spiral, see FIG. 18. Sheet metal 204 is not continuous as there is a break to form an opening 206.

There is attached to the sheet metal 206 refractory brick 208. The refractory brick 208 can be attached by means of sheet metal screws 210 and an adhesive 212. Also, there is on the periphery of the sheet metal 204, and depending therefrom, a circumscribing depending rim 214. This rim 214 assists in maintaining the product in the furnace 28 between the rotating lower circular member and the upper stationary circular member.

Again, the opening 206 is to allow material to be introduced onto the rotating lower member.

An advantage of the upper circular member 200 is that it is not necessary to cut the refractory brick into the configuration of a frustum of a cone, see refractory brick 110 in FIG. 3. The refractory brick 208, in the main, can be standard, commercially, available brick. The use of this standard brick results in a less expensive upper circular member 200. Also, the sheet metal 204 can be shaped into the form of the split circular spiral.

The material 220 to be processed can be positioned on the chute or conveyor 132 and then placed on the firebrick of the first circular member, see FIG. 4. In FIG. 4, it is seen that this first circular member rotates in a clockwise direction and that the material is processed into semiprocessed material 222. After the material has been further processed into a product 224, the material can be removed from the lower circular member by means of doctor blade 134. The product 224 will fall onto the chute 136 for further treatment, such as packaging, or for use, such as in light weight concrete, gardens, insulation, filter aid, and the like.

Some of the material which can be processed in this furnace 28 are perlite, vermiculite, volcanic ash, pumice, zeolite, clay, diatomaceous earth, carriers for radioactive materials, titanium dioxide, salt cake, and the like.

The furnace 28 can achieve a temperature in the range of about 2500° to 2600° F. This is a sufficiently high temperature to process these materials.

It is possible to introduce the material 220, viz., perlite, vermiculite, volcanic ash, pumice, and zeolite into the furnace 28. This material 220 on the firebrick will be heated and expand. For example, the density of the perlite 220 being introduced into the furnace 28 may be in the range of about 80 pounds per cubic foot while the density of the processed perlite 224 or expanded perlite 224 may be in the range of 5 pounds to 10 pounds per cubic foot. For example, the expanded perlite may have a density in the range of 3 pounds to 4 pounds per cubic foot and may range in particle size from +50 mesh to −100 mesh. Perlite in the range of 15 to 20 pounds per cubic foot may have a particle size of about $\frac{5}{8}$ of an inch. I have found that it is not necessary to use a flux with perlite. The perlite can be expanded without the use of a flux, such as sodium carbonate, potassium carbonate, sodium oxide or potassium oxide. With the operation of the furnace 28, I have noticed that the perlite is, apparently, annealed and is stronger or tougher than expanded perlite made in a rotary furnace or a verticle furnace. The use of the expanded perlite can be for purposes of insulation, a filter aid for food products, an aggregate in light weight concrete, and a soil conditioner for horticultural purposes.

Vermiculite can be treated in a manner similar to the treatment of perlite. Vermiculite is a schist and comprises a mixture of vermiculite and hornblend. The vermiculite ore can be passed through a rotary dryer and then screened to a size in the range of $\frac{1}{8}$ inches to +40 mesh to form the material 220 to be expanded. The vermiculite 220 is introduced into the rotary furnace 222 and processed to form the processed vermiculite 224. The processed vermiculite 224 is softer than the processed perlite 124. However, the processed vermiculite can be used for purposes of insulation and as an aggregate in the formation of insulation board. It is possible to saw the insulation board, nail the insulation board, and use the insulation board in building a structure, such as a house or a shop.

In addition to expanding or bloating materials, such as perlite and vermiculite, in the furnace 28, this furnace can also be used for calcining materials. For example, materials 220 which can be calcined are diatomaceous earth, clay, cement, titanium dioxide, fly ash, volcanic ash, natural zeolites, and pumice, to name a few. Many of these materials are of such a small size, even approaching the size of powder, it is not reasonable to process these materials in the furnace 28. In order to process these materials, it is necessary to add a binder to make the material somewhat sticky to form a sticky material. Then the sticky material is placed on a screen or a similar device and agitated to cause the sticky material to ball up or to agglomerate so as to form an agglomerated material. In this process of forming the agglomerated material, the particle size can be, readily, controlled. The transformation of the powder material to a larger and specific particle size by the agglomeration process allows precise control of the bed thickness of the material 220 on the fire brick of the furnace 28.

To make the agglomulated product, there is employed a binder. The binder can be one of many chemicals or a combination of chemicals varying from plain water to complex chemicals depending upon the requirements of the material being treated. For example, in the calcining of diatomaceous earth for filter aid products, there is added to the diatomaceous earth a sodium flux, such as sodium carbonate. However, other sodium compounds can work as well as sodium carbonate, such as sodium hydroxide, sodium chloride, sodium silicate, and corresponding potassium compounds. One of the fluxes can be in liquid form such as sodium carbonate diluted with water. In the case of the calcining of clay, the addition of water as a binder and then the balling up or agglomeration of the clay can be achieved. The agglomulated clay particles will hold together long enough to satisfy the bed thickness requirement in the furnace 28. In certain instances, where higher heat requirements might be needed, they can be achieved with the use of air and a natural gas combustion mixture; the binder can be a fuel, either liquid or solid. For example, in the processing of cement, there may be mixed coal and cement and an oxidizing agent to form the agglomerated product. The coal is burned in the furnace 28 and the ash from the coal can become integrally mixed with the cement. If the ash from the coal is detrimental to the product 224 from the furnace 28, then liquid petroleum can be used as the binding agent in the agglomeration process. The oxidizing agent may be a potassium chlorate.

In the calcining of these materials, the step of forming agglomerated products is important. By being able to have the agglomerated products within a certain range of sizes or within a certain size range, it is possible to control the thickness of the material 220 on the firebrick. This makes possible a more precise control of heat transfer to the material 220. The heat transfer to the material 220 can be quicker and easier for a controlled bed thickness as contrasted with a bed thickness which is not controlled. Also, a more uniform processed product 224 can be realized with a controlled bed thickness of the material 220.

The finely divided material and the powder which have been processed to make an agglomerated product 220 can be further processed in the furnace 28 to calcine the agglomerated product. In calcining the agglomerated product 220, the product is heated to a high temperature without fusing the product 220 to make the processed product 224. In the calcining operation, the agglomerated product 220 undergoes changes, such as oxidation, and also changes, such as forming a smooth or glasslike surface on the processed product 224.

An example will assist in explaining the agglomerating process and also the calcining process. A suitable subject is diatomaceous earth which is a nonmetallic mineral composed of about 80% to 90% amorphous silica. The silica is the skeletal remains of diatoms in the ocean, millions of years ago. The crude diatomaceous earth is mined by open pit methods and transported to a plant site. The mined, crude diatomaceous earth is crushed, dried, and then pulverized and foreign material separated. At this stage of the process, the crushed diatomaceous earth will pass 90% through a 325 mesh screen (44 microns). The crushed diatomaceous earth is mixed with a flux. The flux can be sodium carbonate or sodium silicate, or sodium oxide, or potassium carbonate or potassium oxide, or potassium silicate. It is advantageous to mix the flux with water to form a liquid flux. The liquid flux is mixed with the crushed diatomaceous earth and formed into the agglomerated product 220. Then, the agglomerated diatomaceous earth 220 can be introduced into the furnace 28 and heated to form the processed diatomaceous earth product 224 which has a glaze or a glassy surface on the individual agglomerated particles. In the furnace 28, the sodium in soda ash reacts with the silica of the diatomaceous earth at a temperature of about 1850° F., to form the product 224.

Similarly, fine particles of clay can be mixed with water and processed to form agglomerated clay. The agglomerated clay 220 can be introduced into the furnace 28 and heated and processed to form agglomerated clay products 224, which have a smooth or glassy like surface.

Similarly, fine particles of titanium dioxide, fly ash, volcanic ash, cement, natural zeolite, pumice, and the like can be mixed with a flux, such as a sodium salt like sodium carbonate or sodium silicate or a potassium salt like potassium carbonate or potassium silicate and formed into agglomerated products 220 which can be introduced into the furnace 28 to form a processed product 224 having a smooth or glassy surface.

The calcined clay has a higher brightness and opacity than natural clay and therefore is valuable in the manufacture of high-gloss paper. The calcined clay has better hiding power in the high-gloss paper.

A calcined diatomaceous earth, calcined in the temperature range of about 1750°-1900° F. can be used as a filter aid, used as a filler in paint and also used as a filler in paper.

In regard to diatomaceous earth which is used as a filter aid, the calcining process can be valuable in rejuvinating the filter aid. For example, the filter aid comprising spent diatomaceous earth can be processed and mixed with a binder, such as sodium silicate to form an agglomerated product 220 in the form of a discrete unit or a ball. Then, this discrete unit or ball 200 can be introduced into the furnace 28 and heated to a temperature in the range of about 1750°-1900° F. to form a new filter aid comprising the glazed or glassy diatomaceous earth ball or discrete unit. A result of this is the reusing of diatomaceous earth and the elimination of the step of throwing away used diatomaceous earth which has served a purpose as a filter aid.

In addition to being able to calcine volcanic ash and pumice, it is also possible to expand the volcanic ash and pumice in the furnace 28 in the same manner that perlite and vermiculite are expanded, as above disclosed. Further, zeolite can be expanded in the furnace 28 and also can be calcined in the furnace 28.

In FIG. 12, there is illustrated a process for treating radioactive material so that the radioactive material can be stored.

Radioactive material 230 and solid particles 232, such as diatomaceous earth, clay, cement, fly ash, volcanic ash, natural zeolites, and pumice, are mixed together at step 234 to form a mixture of agglomerated product.

Then, at step 236, the agglomerated product or mixture is calcined to form a solid encapsulated material. The encapsulated material comprises the radioactive material and the solid particles. The encapsulated material can be stored at step 238. Or, the encapsulated material can be mixed with a shielding material, such as lead or boraxo or polyethylene at step 240 to form a shielded encapsulated material comprising the radioactive material. In this manner, there are prepared small, discrete, solid particles comprising radioactive material and which small, solid, discrete particles can be coated with a shielding material to lessen the radiation from the small, discrete particles. The shielded encapsulated material can be stored at 242.

The process of FIG. 12 makes it possible to transform the radioactive material, usually in a liquid form, into a solid and then to coat the solid with radioactive shielding material so as to make it possible to more, safely, store the radioactive material.

In FIG. 13, there is illustrated a process for treating objects 250 contaminated with radioactive material. For example, objects 250 which are contaminated with radioactive material are paper, clothing, gloves, rubber, plastic and the like which are used in the area of radioactive material. In this process, the objects 250 can be frozen at step 252 to form a solid frozen object. The objects 250 may be frozen by being contacted with liquid nitrogen so as to form a brittle, solid, frozen object.

Then, in step 254, the brittle, solid, frozen object can be comminuted to small pieces. The brittle, solid, frozen objects may be comminuted in a ball mill or hammer mill or appropriate apparatus. The solid, frozen objects are processed at step 256 by burning so as to leave a radioactive residue which can be collected. The radioactive residue may be trapped in stack gases by a filter. It is to be remembered that radioactive particles are discrete particles and are not gases. The radioactive particles are solid and therefore can be trapped by a filtering means. Further, the step 256 reduces the volume of the objects containing the radioactive material. Prior to steps 252, 254, and 256, the volume of the objects containing the radioactive material was quite large. With these steps, the volume of the radioactive material is reduced to a more manageable volume.

The radioactive residue 258 is mixed with a solid 260. The solid 260 may be a chemical which can be calcined, for example, diatomaceous earth, clay, cement, titanium dioxide, fly ash, volcanic ash, natural zeolites, pumice, and the like. At step 262, the radioactive residue and the solid 260 are mixed to form a mixture 264. The mixture 264 may be stored at 266.

The mixture 264 may be calcined in the furnace 28, see step 268, to form a calcined mixture. The calcined mixture has a smooth or glossy appearance and is a solid. The calcined mixture in step 270 can be mixed with a shielding material, such as lead, boraxo, polyethylene and the like to form a shielded calcined material. At step 272, the shielded calcined material can be stored. The shielded calcined material is a solid and the radioactive waste is stored as a solid. The shielding of the radioactive waste lessens the radiation escaping into the surrounding atmosphere from the radioactive waste.

The calcined mixture from step 268 can be stored at 274.

If the solid 260 be perlite or vermiculite or volcanic ash or pumice, then the mixture 264 can be processed in the furnace 28 at step 276 to form an encapsulated, radioactive residue. The radioactive residue can be stored at step 278. The encapsulated, radioactive residue is a solid and can be easily handled in the solid form. At step 280, the encapsulated, radioactive residue can be mixed with a shielding material, such as lead, borax, or polyethylene to form a shielded, encapsulated, radioactive material. The shielded, encapsulated, radioactive material can be stored at step 282. In FIG. 13, it is seen that there has been provided a process for treating an object contaminated with the radioactive material and then to store the resulting radioactive residue either in a calcined form or in an encapsulated form. In both the calcined form and the encapsulated form, the radioactive residue is a solid and can be, readily, handled.

In FIG. 14, there is illustrated a process for processing salt cake 300. Salt cake comprises radioactive material and may be a solid, a liquid, and a mixture of solids and liquids. In the processing step, salt cake 300 is mixed with clay 302 to form agglomerated particles. These agglomerated particles can be classified as to size and introduced into the furnace 28. In the furnace 28, the agglomerated particles of clay and salt cake can be heated to form calcined particles 306. These calcined particles 306 are a solid and have a glassy or glossy appearance. It is to be remembered that these calcined particles 306 are discrete units of, substantially, the same size as the agglomerated particles formed by mixing the clay and salt cake. At step 308, the calcined particles can be stored. At a desirable time, the calcined particles 306 can be taken from storage 308 and processed in step 310 to form retrieved radioactive material 312. The retrieved radioactive material 312 may be used in a suitable and desirable manner.

Instead of storing the calcined particles 306, it may be desirable in step 314 to coat these calcined particles with a shielding material 316. The shielding material may be lead, borax, polyethylene, to name a few suitable shielding materials. The coating of the calcined particles of the shielding material results in shielded particles 318. The shielded particles 318 are safer to store than the calcined particles 306 and are, therefore, more easily stored than the calcined particles 306. At a suitably desirable time, the shielded particles 318 can be processed at step 320 to form retrieved radioactive material 312.

In FIG. 15, there is illustrated the process of mixing a particle 330 with a binder 332. As previously stated, the particle may be diatomaceous earth, clay, cement, titanium dioxide, fly ash, volcanic ash, natural zeolites, pumice, to name a few. The binder may be water, sodium carbonate, sodium silicate, sodium oxide, potassium oxide, potassium carbonate, potassium silicate, to name a few suitable binders. At step 334, the particle 330 and the binder 332 may be mixed to form a mixture and then the mixture agglomerated to a suitable particle size to form an agglomerated mixture 336.

The agglomerated mixture 336 may be introduced into the furnace 28 and the agglomerated mixture calcined at step 338. As previously explained, in the calcining of the agglomerated mixture, there is formed glossy or glassy or smooth particles identified as a calcined mixture 340. The calcined mixture 340, has previously been referred to as the processed product 224 and the agglomerated mixture has previously been referred to as the agglomerated product 220.

In FIG. 4, the doctor blade 134 need not touch the firebrick of the lower circular member 30 but, instead, can be an air doctor blade for blowing or moving the product 224 across the firebrick and toward the sloping conveyor 136 for removal from the vicinity of the furnace 28.

One of the advantages of the furnace 28, as compared with a rotary furnace or a vertical furnace or a horizontal stationary furnace is that less air is required in the furnace 28 than with any of the other furnaces. For example, with the furnace 28, the air required is the air of combustion to burn the fuel. There is no need to heat extraneous air for removing the expanded product, such as bloated perlite or bloated vermiculite or bloated volcanic ash or bloated pumice from the furnace. In the other furnaces, air is needed for both combustion and the removal of the bloated product from the furnace. With the furnace 28, it is possible to heat the furnace to a temperature of about 2000° F. in approximately 5 minutes.

With the furnace 28, as compared to the above enumerated furnaces, it is not necessary to predry the material to be processed to a moisture content of less than 1%. It is possible to use perlite having a moisture content in the range of 3% to 10%. With the above enumerated furnaces, such as a vertical furnace or a horizontal furnace or a rotary furnace, it is necessary to dry the material to be processed to a moisture content less than one percent. In these furnaces, the residence time is approximately one second. In the furnace 28, the residence time can be varied to suit the material to be processed and the residence time can be varied from about five seconds to sixty seconds. In fact, the residence time can be varied over a much wider range of time than from five seconds to sixty seconds as the residence time may be two minutes or three minutes.

The fuel which can be used and introduced into the plenum chamber can be a liquified petroleum gas, propane, butane, water, gas, diesel in gaseous form, and the like. As previously stated, there can be admixed with the material to be treated a solid fuel such as coal or there can be used diesel as a binder in forming the agglomerated particle to be introduced into the furnace.

In a rotary furnace, the fuel efficiency is approximately 10%. A highly efficient rotary furnace may have a fuel efficiency of 30%. With the furnace 28, I estimate that the fuel efficiency varies between approximately 60% to 85%. Again, a main reason for this difference in fuel efficiency is that is it not necesssary to heat extraneous air in the furnace 28 while it is necessary to heat extraneous or carrier air in the rotary furnace. Another reason for the greater fuel efficiency of the furnace 28 is that it is not necessary to heat such a large mass as compared with the rotary furnace. The furnace 28 is more compact, less mass, smaller size, and therefore there is not a large mass of material to heat as compared with the rotary furnace. Also, there is less heat loss from the furnace 28 as compared with the rotary furnace.

As previously stated, the furnace 28 can be used to regenerate filter aids. For example, a filter aid prepared from perlite or a filter aid prepared from diatomaceous earth can be regenerated in the furnace 28 at a temperature in the range of about 1500° F. to 2000° F. This results in a saving in the processing of a filter aid and also means that it is not necessary to discard used filter aids.

In the furnace 28, it has been shown and described that the spacing between the reflector brick and the firebrick can be varied to accommodate the material 220 to be processed into the product 224. Initially, when the material 220 is introduced into the furnace 28, the spacing between the reflector brick and the firebrick is a small distance. This results in more radiant heat on the material 220. If the material 220 expands into an intermediate product 22, the spacing between the reflector brick and the firebrick is increased to accommodate the larger size. Then, near the end of the cycle or process, the spacing between the reflector brick and the firebrick is greatest to accommodate the expanded material. With this furnace, it has been noticed that it has been possible to expand perlite particles and make the particles extremely strong compared to expanded perlite particles from a rotary furnace or a verticle furnace or a stationary horizontal furnace. The expanded perlite particles from the furnace 28 were heavier than the expanded perlite particles from one of the three above-enumerated furnaces. Further, with the furnace 28, it is possible to expand perlite particles of comparatively large size into comparatively strong expanded perlite particles. This has not been accomplished in the perlite industry with a rotary furnace or a vertical furnace or a horizontal furnace.

As previously stated, the firebricks were selected so as to be as uniform as possible. A standard for uniformity was that the bricks were to weigh, substantially, the same. Also, the bricks were painted on the ends and sides with a fireproof paint so as to seal the ends and sides. Then, the combination of air and combustible gas could be introduced into the plenum and this combination flow through the brick and onto the surface of the brick where the combination was ignited and burned. In a test, it was estimated that the fuel consumption was, with the furnace 28, in the range of 3,000,000 BTU's per ton of product, such as expanded perlite. With a rotary furnace or a vertical furnace or a stationary horizontal furnace, the fuel consumption is in the range of 4,000,000-4,500,000 BTU's per ton of expanded perlite. It is seen that there is a saving of approximately one-third to one-half of the fuel in the furnace 28 as compared with one of the other three furnaces. To assist in maintaining a long life for the firebrick, there was attached a block of porous aluminum oxide on top of the firebrick. One of the requisites for the aluminum oxide was that it would have a porosity equal to that of the firebrick.

In the furnace 28, it is seen that the adapter 80 is free to rotate, with the first circular member 30, around the outlet nozzle 78. The adapter 80 and the outlet nozzle 78 function as a swivel. The adapter 80 can rotate, completely, around the nozzle 78 along with the rotation of the first circular member 30. The gas passes through the pipe 74, mixing chamber 76, outlet nozzle 78, adapter 80, arms 82 and 84, or 190 and passes into the plenum chamber and flows through the porous brick so as to be burned on top of the firebrick. The material 220 to be processed is heated by conduction from the surface of the firebrick, by convection of gas, products of combustion, flowing from the firebrick to the material 220, and also by radiation from the reflector brick positioned above the firebrick and also above the material 220. The flowing of the mixture of air and combustible gas through the firebrick and also on top of the firebrick assists in keeping the material 220 being processed from sticking to the firebrick. The flowing gases raise or elevate the material being processed from the surface of the firebrick so as to lessen the possibility of the material sticking and adhering to the firebrick. With this method of burning the gas on the upper surface of the firebrick, it is possible to attain a temperature in the range of about 2600° F. The material 220 is heated by radiation from the reflector brick and which reflector brick or which reflector may be as close as one-quarter of an inch to the firebrick. When the material 220 is, initially, placed on the firebrick, the reflectors may be as close as one-quarter of an inch to the firebrick. With the expansion of the material 220, it is necessary to position the reflectors farther away from the firebrick so as to allow the expanded material or processed material 222 to be carried by the rotating firebrick to the outlet of the furnace 28. If the reflectors were not positioned farther away from the firebrick, then the reflectors would interfere with the movement of the material 222 being processed. In certain instances, the reflectors may be as much as one and one-half inches away from the firebrick to accomodate the material being processed.

I consider that one of the advantages of this invention is that the retention time of the material to be processed in the furnace 28 can be accurately controlled. As previously stated, the retention time can be varied from five seconds up to two or three minutes or even longer. The ability to vary the retention time makes it possible to process material in a manner which has not been previously processed. For example, if, after the particle has been expanded, the expanded particle is retained in the furnace or heat zone, the surface of the particle tends to fuse. This causes a slight shrinkage in the particle but the strength of the particle is greatly increased. Because the retention time in the furnace can be controlled, much larger particles can be expanded with the furnace 28 than with the other furnaces, such as the vertical furnace, the rotary furnace, or the horizontal furnace. Again, remember that after the particle has been expanded and if it be retained in the furance, an annealing process or a fusing of the surface of the particle takes place to increase the strength of the particle. This creates the possibility of making high-strength, light-weight concrete blocks. In the forming of expanded or bloated particles and also in the calcining of particles with the furnace 28 and with my method, it is possible to expand and calcine materials without the necessity of drying the materials as contrasted with the conventional processing methods in a vertical furnace or rotary furnace or horizontal furnace wherein the material to be processed must be almost bone dry.

As stated, air and a gas, such as liquified natural gas or propane or butane, can be mixed and burned on top of the firebricks to realize in the temperature range of about 2600° F., and, it is conceivable, that in place of air there can be used oxygen so as to form an oxygen-natural gas mixture which can be burned on top of the firebrick. The heating process can be used for calcination of properly prepared mixtures of alumina-silicate materials and radioactive waste products, primarily, salt cake or sodium nitrate-nitrite complex containing cesium 137 and other radioactive products. With calcination, there is a fusion of the alumina-silicates with the radioactive product thereby causing the radioactive products to be encased in a glasslike matrix. The radioactive products become a solid, nonleachable form of material suitable for short term or long term storage. Again, this is of value as in many instances, the salt cake or sodium nitrate-nitrite complex containing cesium 137 and other radioactive products may be in a liquid form or may be in a liquid-solid combination or mixture. The salt cake or sodium nitrate-nitrite complex can be mixed with a calcining agent like diatomaceous earth, clay, cement, fly ash, volcanic ash, natural zeolites, pumice, and the like, to name a few and the salt cake can be used as a binder. Then, the resulting mixture can be made into agglomerated particles of desired size and then these agglomerated particles of the salt cake and the carrier, such as diatomaceous earth or clay can be calcined and fused so that a solid results and which solid contains the radioactive materials. A contributing factor to storing the salt cake and radioactive materials in solid form is the step of agglomerating the mixture of the radioactive materials and the diatomaceous earth or clay or the like into balls or discrete units of, substantially, the same size. With the formation of these agglomerated particles of discrete size and of substantially the same dimensions, it is possible to have a precise control of the bed thickness of the particles to be processed on the firebrick. The control of the bed thickness with the control of the retention time makes it possible to carry out the calcination step and, when desirable, the bloating or expanding step on the various particles. This, in turn, permits faster and more efficient use of the heat transfer to the particles being processed. The agglomeration process also allows for the reprocessing of waste materials into useful products. An example is perlite fines can be processed into a perlite aggregate, a mixture of spent filter aid (either diatomaceous earth or perlite) and unexpanded perlite ore can be reprocessed back into a filter aid or can be processed to make a light-weight aggregate for use in concrete or a mixture of fly ash and unexpanded perlite ore can be processed to produce a light-weight aggregate or a filter aid.

Again, I consider that one of the main advantages of the furnace 28 and this method is the ability to achieve a product equal to or superior than achieved with a vertical furnace, a stationary horizontal furnace, or a rotary furnace with less fuel consumption. The fuel consumption of this furnace and method is in the range of about one-half to two-thirds of that achieved with one of those enumerated furnaces. In this regard, an article by Herbert A. Stein, "MEASURES FOR CONSERVATION OF FUEL IN THE EXPANSION OF PERLITE" states:

"With the high cost of fuel today, it is more important than ever to reduce the amount of fuel used in expanding perlite.

"Perlite expanding processes are often operated at very low fuel efficiency, sometimes less than 25%. Some of the reasons for this are as follows:

"1. Present-day expanders are co-current, that is, the perlite and the flame enter the expansion chamber together and leave together. This means that the hot gases leave the furnace at a higher temperature than the expanded perlite. The co-current operation is in contrast to the counter-current operation used in cement kilns and boilers, for example, where the incoming feed absorbs heat coming from the hot zone.

"2. Present-day expander tubes are uninsulated and made of metal, to operate at a lower temperature in order to avoid fusion and damage to the tube. As a result, more heat often passes through the furnace tube wall than is needed to expand the perlite.

"3. Many perlite expanding processes do not involve recovering wasted heat by using it to preheat the ore or the combustion air.

"4. Many furnaces, especially verticals, are operated with too much air flow well in excess of what is needed for combustion. This air must be heated to the operating temperature.

"5. Many furnaces are operated at a production rate which is too low for good fuel efficiency per ton, often because the auxiliary equipment (such as cyclones, air locks, and cooling and bagging facilities) is too small to handle the higher production rate.

"6. Another cause of high fuel consumption due to too low a production rate is the use of an ore which is coarser than necessary for the intended end use of the expanded perlite."

As constrasted with the comments of Herbert A. Stein, I consider that there is not a waste of fuel with my furnace and my method. The air introduced into my furnace is used for combustion and not for conveying the products from the furnace. Therefore, there is less heat energy required as it is not necessary to heat extraneous carrier air. Also, the product is at a higher temperature, upon leaving the furance, than the temperature of the products of combustion. The production rates of my furnace can be varied to accommodate the material to be processed and also with my furnace, used in conjunction with the agglomeration process, it is not always necessary to use cyclones, air locks, cooling and bagging facilities and the like. I question if it be possible to use agglomerated particles in a rotary furnace or a vertical furnace or a stationary horizontal furnace. I think that with my furnace there is an expansion of materials which can be processed to make a useful product.

In FIGS. 19 and 20 there is a fragmentary view of a furnace 350. Part of the furnace 350 is the plenum chamber 352 in the configuration of a torus.

The plenum chamber 352 has a bottom wall 354, a top wall 356. On the top wall 356 there are passageways 358. The top wall 356 can be a grate for having the passageway 358.

There is an inner wall 360 connecting the bottom wall 354 and the top wall 356. The inner wall 360 is in the configuration of a circle.

There is an outer wall 362 connecting with the bottom wall 354 and connecting with the top wall 358. The outer wall 362 is in the configuration of a circle.

In the bottom wall 354 there is a hole 86 similar to the hole 86 of FIG. 6. A pipe 82 connects with the hole 86 as in a manner similar to FIG. 6. The pipe 82 is a conduit or a mixture of air and natural gas into the plenum chamber 352 defined by the bottom wall 354, the top wall 356 and the walls 360 and 362.

There is positioned on the upper surface of the top wall 358 porous firebrick 38. There is positioned between the sides of the porous firebrick 38 a silicone adhesive 364. The reader is to understand that the adhesive 364 can be any suitable adhesive and does not have to be silicone adhesive. The adhesive 364 must be able to withstand a fairly high temperature. There is positioned on top of the firebrick 38 porous ceramic tile 366.

There is positioned, in a spaced-apart relationship, above the lower ceramic tile 366 upper ceramic tile 368. The upper ceramic tile 368 can be positioned in a manner such as illustrated in FIGS. 1, 7, 8, and 18. The spacing of the upper ceramic tile 368 with respect to the lower ceramic tile 366 can vary depending on the material being processed in the furnace. In certain instances it may be desirable to have the upper ceramic tile 368 positioned on the lower surface of refractory brick 110. In FIG. 19 the refractory brick 110 is in phantom to allow the reader to understand that the brick 110 may be used or may not be used. An adhesive 370 joins the adjacent refractory brick 310. The upper ceramic tile 368 can be attached to the refractory brick 310 by means of a suitable adhesive or other suitable means. The adhesive 370 between the refractory brick 110 must be able to withstand the moderate degree of heat. The lower ceramic tile 366 and the upper ceramic tile 368 are insulators. Therefore, the firebrick 38 and the refractory brick 110 will not reach the temperature of the surface of the tiles 368 and the tile 366 reach.

There is a depending ceramic tile 372 from the outermost edge of the ceramic tile 368. An adhesive 374 connects the ceramic tile 368 with the depending ceramic tile 372. The adhesive 374 must be able to withstand a high temperature. It may be dedirable to use a silicone adhesive or other suitable adhesive.

In some of the ceramic tile 366 I have increased the porosity by drilling holes 376 through the ceramic tile 366. The holes are of a small diameter ranging from about 1/64th of an inch in diameter to about 1/32nd of an inch in diameter. The reader is to realize that the ceramic tile 366 is an insulator. Also, the firebrick 38 is an insulator. A mixture of air and a natural gas such as propane or butane flow through the pipe 32 and into the plenum chamber 352. One would expect that with the burning of the air and natural gas on top of the ceramic tile 366 that combustion of the mixture of air and natural gas in the plenum chamber would occur. The firebrick 38 is a good insulator. The mixture of air and natural gas can rise through the firebrick 38 and burn on top of the firebrick 38 and yet the temperature of the air and natural gas in the plenum chamber 352 is so low that this mixture will not ignite. With the addition of the ceramic tile 366 on top of the firebrick 38 the mixture of air and natural gas will rise through the passageways 358 and the top wall 356, rise through the firebrick 38 and rise through the ceramic tile 366 to burn on top of the ceramic tile 366 without combustion occurring in the plenum chamber 352.

In FIGS. 21 and 22 there is illustrated a modification of the furnace 350. In FIG. 21 there is illustrated a furnace 378 having a plenum chamber 352 which has been described with respect to FIGS. 19 and 20. There is a ceramic trough 380. In FIG. 22 it is seen that the ceramic trough 380, in a plan view, is in the general configuration of a trapezoid. There is a bottom 382. There is an inner upright curved wall 384. There is an outer curved upright wall 386. There are side walls 388 connecting the walls 384 and 386. In effect, it is seen that the ceramic trough offers a cavity for receiving material. There can be positioned in this cavity a bottom layer 390 of a heat resistant material. In FIG. 21 the bottom layer 390 is illustrated by circular members. The bottom layer 390 may be sand, rock, alumina, which is aluminum oxide and other inert material which can withstand high heat without fusing. There is positioned on top of the bottom layer 390 material 392 which is to be heated or calcined. For example, there can be positioned on 390 cement which heated and calcined. Also, the material 392 can be zeolite, vermiculite, perlite to name a few of the other materials which can be heated and calcined.

The upper ceramic tile 368 can be positioned above the ceramic trough 380. Also, there may be used refractory brick 110. The upper ceramic tile 368 is positioned below the refractory brick 110.

There may be an upright ceramic board 394 positioned on the outer edge of the firebrick 38. The board 394 may connect with the firebrick 38 by means of an adhesive 396.

In operation the mixture of air and natural gas is introduced through pipe 82 into the plenum chamber 352. Then, this mixture rises upwardly through the passageway 358 in the top wall 356 and also passes upwardly through the porous firebrick 38. The air and natural gas mixture, while leaving the firebrick 38 passes upwardly through the bottom 382 of the porous ceramic trough 380. The air and natural gas mixture can then ignite and combust in the bottom layer 390 and also can proceed to combust while travelling upward through the material 392 be heated and calcined. The combustion of the air and natural gas mixture can occur in the ceramic trough 380 and also above the ceramic trough 380 and underneath the upper ceramic tile 368.

In FIGS. 19 and 20 the combustion of the air and the gas mixture occurs near the upper surface of the lower ceramic tile 366 and above the upper surface of said tile. In FIGS. 21 and 22 the combustion can take place in the ceramic trough 380 and among the bottom layer 390 and also among the material 392 being heated and calcined. As the combustion takes place in these conditions, it is possible to say that this is a burning hearth furnace. The hearth being the lower ceramic tile 366 and the ceramic trough 380. The mixture of air and natural gas burns, to a degree, directly above and in close proximity to the upper surface of the lower ceramic tile 366 and also directly above and in close proximity to the upper surface of the bottom 382 of the ceramic trough 380.

To remove the material which has been heated from the furnace 350 and also from the furnace 378 there can be used a doctor blade as illustrated in FIG. 4. In FIG. 4 the doctor blade is 134. Also, there is illustrated a doctor blade 134 in FIG. 11. The reader is to understand that the doctor blade 134 can be a mechanical doctor blade for removing the heated or calcined product from the space between the lower ceramic tile 366 and the upper ceramic tile 368 or between the ceramic trough 380 and the upper ceramic tile 368 as the plenum chamber 352 rotates. The doctor blade 134 removes the heated or calcined product. The doctor 134 may be an air doctor for blowing or pushing the heated or calcined product off of the rotating plenum chamber 352 and the lower ceramic tile 366 or the ceramic tile 390 positioned on top of the plenum chamber 352. It is conceivable that in addition to an air doctor 134 for blowing the product out of the furnace, that in certain instances there may be used an electrostatic doctor 134 for repelling the product out of the furnace by means of electric charge.

In FIG. 23 there is a schematic flow sheet 400 for heating and calcining a raw material. The raw material may be clay.

There is illustrated a rotary furnace 420 having a plenum chamber 404. The mixture of air and natural gas is introduced into the plenum chamber and rises upwardly through the firebrick, and if appropriate, the ceramic board. The air and natural gas mixture is burned in the rotary furnace 402. The furnace 402 has a hood 406.

Material 408 is a material being heated and calcined.

There is a rotary dryer 410 for, partially, drying the raw material 412 being introduced into the furnace 402.

There is a first preheater 414. The raw material upon leaving the rotary dryer 410 is introduced in the first preheater 414. The raw material absorbs some heat from the furnace 402. The raw material leaves the furnace 402 and is introduced into the second preheater 416. In the second preheater 416 the raw material is further heated. From the second pre-heater 416 the heated raw material moves to a feeder 418 which introduces the heated raw material into the furnace 402.

There is a cooler 420. The hot material leaving the furnace 402 is introduced into the cooler 420. A blower 422 blows cold air into the cooler 420 to cool the product from the furnace 402. The cool product 430 can leave the cooler 420.

Hot air 424 from the cooled cooler 420 flows to the second preheater 416. The hot air from the second preheater 416 is identified as air 426 which can flow to the rotary dryer 410 or can mix with hot air 428 from the furnace 402. The hot air 426 and the hot air 428 enter into the rotary dryer 410 to heat and to dry the raw material 412 which may be clay.

Again, the product 430 can leave the cooler 420.

In FIG. 24 there is flow sheet illustrating the transformation of raw materials 412, such as clay, to the product 430.

At step 440 the raw material is dried, see reference numeral 410 of FIG. 23.

At step 442 the raw material is heated in a first preheater, see 414 of FIG. 23.

At step 444 there is a second pre-heat of the dry raw material, see 416 of FIG. 23.

At step 446 the dry raw material is calcined, see 402 of FIG. 23.

At step 448 the calcined product such as calcined clay is cooled, see 420, FIG. 23.

Cool air or cool gas is introduced at step 448 to cool the hot product. The cooled product 430 exits from the cooling step.

A hot gas 452, such as air, leaves step 448 and is introduced at step 444 to assist in pre-heating and drying the raw material.

From the calcination step 446 hot gas 452 exits and is introduced at step 440 to dry the raw material.

From the second pre-heat step 444 a hot gas 454 exits and is introduced at step 440 to assist in drying the raw material.

From the step 442 a hot gas 456 exits and is introduced at step 440 to dry the raw material.

From step 440 there exits a hot humid gas 458. The hot humid gas 458 does not have the temperature of the hot gas as 452 and 456 entering step 440. Nevertheless, the hot gas 458 does pick up moisture from the raw material and exits as a hot moist gas.

In FIG. 25 there is illustrated another calcining process. A raw material 412 such as clay or cement may be heated and calcined at step 460. There is used in the calcining step 460 a mixture of oxygen fuel such as natural gas or vaporized diesel fuel to supply the heat energy. There can be introduced into the calcining step 460 a gas such as carbon dioxide 464. The carbon dioxide 464 assists in infrared radiation so as to assist in the elevation of the temperature of the raw material 412 being calcined at step 460. After the calcining step has been realized there is produced a product 430. The product 430 can be removed from the calcining step 460.

In FIG. 25 the oxygen in the oxygen and fuel mixture 462 can be made from a manufactured air process. The oxygen can be manufactured in an absorbtion system using zeolite. This process is referred to as a pressure swing absorbtion. Again, the oxygen can be mixed with carbon dioxide. The manufactured air is made of about 80% carbon dioxide and 20% oxygen. One of the advantages of such a mixture for the combustion of fuels such as natural gas and vaporized diesel is that carbon dioxide absorbs and radiates infrared energy. Nitrogen does not absorb and radiate infrared energy. Carbon dioxide and water vapor can radiate infrared energy. The absorbtion and radiation of the infrared energy by carbon dioxide assists in the calcining step 460 or the raw material 412. With the absorbtion and radiation of infrared energy by the carbon dioxide the efficiency of the calcining step 460 is increased considerably.

It is to be understood that my invention and apparatus can be used for calcining, sintering, roasting, expanding, exfoliating and drying a raw material. I consider that my invention and apparatus has some novel features such as the hearth and the burner are the same part as previously explained. The roof on my furnace, the reflector, is very close to the hearth-burner combination. In many instances, the distance between the reflector and the hearth-burner of my invention is less than one inch. The heat of combustion of the fuel elevates the temperature of the reflector. The reflector reflects a considerable amount of infrared energy to the raw material being processed. The distance between the reflector and the hearth-burner is adjustable so that the raw material, initially, is spaced closely to the reflector. If the raw material expands then the distance the reflector is from the hearth-burner is increased and the distance between the raw material being processed and the reflector can remain somewhat constant even though the raw material has expanded. As previously shown the reflector can be made into a spiral.

The hearth-burner, which is porous, allows an air-gas mixture to pass through it. The air-gas mixture is ignited substantially at the surface of the hearth-burner. The air-gas mixture is distributed evenly across the area of the hearth-burner.

If calcium carbonate is calcined it may be desirable to introduce a gas which has a high percentage of oxygen. As previously explained, a manufactured air made of 80% carbon dioxide and 20% oxygen is of value from the infrared radiation of the carbon dioxide. With the calcining of limestone carbon dioxide is liberated and can mix with a gas which is, essentially, oxygen or has a high percentage content of oxygen. With the release of carbon dioxide from the calcium carbonate there results a product known as calcium oxide.

In FIG. 20 there is illustrated ceramic tile or ceramic board 366 have a number of holes 376 drilled into the board. A board which can be used in such a manner is identified as K-3000 Board of Babcock and Wilcox.

With the ceramic trough 380 firebrick 38 can be Babcock and Wilcox K-28. Then, Delta's T-Board can be used as a material for the ceramic trough 380. The Delta T-Board has a better emissivity than the firebrick 380 and therefore should assist in heating and calcining the raw material.

In certain instances the bottom layer 390 in the trough 380 may exceed the temperature the ceramic trough 380 can function. In instances like this, Babcock and Wilcox K-28 firebrick will be used as base brick 38. There is laid in the ceramic tile 380 a layer of Babcock and Wilcox kaowool blanket. Then, the loose material 390 such as sand, rock, alumina or other suitable material is laid on top of the kaowool blanket. The result of this is that a higher temperature can be realized and a greater emissivity can realized to assist in the heating and calcining step.

The firebrick 38 can be selected from many commercial manufactures. I am using a K-28 Babcock and Wilcox firebrick because this firebrick has an extra high air permeability and will stand an operating temperature up to 2,800° F. The extra high air permeability of brick allows the mixture of air and propane to pass upwardly through the brick.

From experience I have learned that the weight of the firebrick 38 is a direct indication of its air permeability. Therefore, the firebrick 38 must be selected so that all of the bricks have nearly the same weight so as to have near the same equal air permeability. A heavy brick mixed with a light brick will have less temperature as compared to the light brick. A Babcock and Wilcox K-28 brick having dimensions of 2½ inches times 4½ inches times 9 inches weighs about three pounds. From experience I tried to maintain the weight of all the bricks within plus or minus one ounce of the average weight of the bricks. By maintaining a close tolerance on the weight of the bricks for equal sized bricks, there is a close tolerance on the air permeability of the bricks and movement of the mixture of air and natural gas upwardly through the brick.

The support I use for the firebrick 38 and the ceramic tile 366 and the ceramic tile 380 is a flat expanded metal. The bricks are glued to the expanded steel metal and to each other at the bottom edges and to the steel parts that make the inner and outer steel circle. The glue I use is silicone caulking No. 108 of General Electric Company. The silicone rubber caulking allows some movement of the brick without rupturing the seal. The firebrick 38 overlies the top wall 356 or the expanded steel metal. Also, the ceramic tile or ceramic board or ceramic trough is of less width than the firebrick 38. As illustrated in FIG. 19 and also in FIG. 21 there is ceramic wall above the upper surface of the firebrick 38 but amost to the outer edge of the firebrick 38 to reflect heat energy back to the raw material, to preclude cold air entering the furnace, to preclude the product from escaping form the furnace, and to assist in the construction of the furnace for maintaining the product at a proper place.

The top surface of the firebrick 38 that is not under the reflector is sealed with paint or cement to prevent the air-gas mixture from coming through the firebrick at that particular place. The paint or cement can be considered to be a valve for controlling the flow of air and natural gas mixture to the hearth-burner.

The doctor 134 can be air pressure for removing the product from the furnace or can be a vacuum for lifting the product off of the ceramic tile or off of the ceramic trough.

From experience, and to date, I have found that the most efficient combination of components is a firebrick identified as Babcock and Wilcox K-28 base brick. Then, a Delta T insulation board of ceramic construction is useful for the lower ceramic tile 366 of the ceramic trough 380. For the upper ceramic tile 368 I use a Johns Manville "Cerachrome 130" ceramic board as a reflector. In the tests I have run the K-28 brick by itself takes about 38% more fule to hold the same temperature as when Delta T insulation board is laminated over the K-28 brick. I consider that this demonstrates that the surface emissivity is a vital key to fuel efficiency in the furnace. The surface emissivity of the ceramic board or Delta T insulation board is greater than the surface emissivity of the K-28 brick. Therefore, with greater emissivity a higher temperature can be realized with the same amount of fuel or if a set temperature is to be realized less fuel is required to realize that set temperature.

It is possible to use a number of different materials for the firebrick and also for the ceramic tile or ceramic trough. A ceramic board or a ceramic tile can be made sensibly from kaolin clay fibers, called kaowool. The ceramic board from kaowool is fairly soft but is stable to a temperature of about 3000° F. Also, the ceramic board is permeable allowing a mixture of air and natural gas to pass through the ceramic board.

The Delta T board is quiet soft but hardens when exposed to heat. Delta T board is stable and has good permeability to temperatures of at least 1,850° F.

A foam can be made from silicone carbide. Such a foam may be useful as a tile or as a trough and has good permeability.

A honeycomb can be made from silicon carbide, lithium alumina silicate, magnesium alumina silicate and the like. The honeycomb should have small holes or small passageways to allow the mixture of air and natural gas or air and fuel to pass through the honeycomb.

For the bottom layer 390 in the trough 380 a loose fill such as particles of silicone carbide and alumina coated with kaowool dust or chromium oxide, to improve emissivity can be used. In certain instances a material has good emissivity such as clay and sand.

The size of the furnace can very depending upon the need. I have established some parameters for the size of the furnace. I think that an energy of 50,000 BTU's (British Thermal Units) per hour per square foot of the ceramic tile or board 366 or the firebrick 38 is a good average number. Also, I think that a limit of the width of the burner deck or the ceramic tile 366 or the firebrick 38 should be not more than four feet. It is possible to have the width of the burners at any reasonable width but because of problems of feeding the raw material to the burner deck and the discharge of the product a practical working width of four feet would be desirable.

An example of a furnace can be a furnace with an outer diameter of twenty four feet and a deck width of four feet. It has a burner surface of approximately 250 square feet. At a heat energy of 50,000 BTU's per square foot per hour this means that the furnace has a capacity of approximately 12,500,000 BTU's per hour. The size of the furnace can be determined with respect to the raw material and the product.

The steel used for the top wall 356 and also for the supporting firebrick can be of standard mild steel. The top wall 356 can be expanded metal approximately 1½ inch #9F-10 gauge mild steel. It can be secured from McNichols Company, 10877 Rockwallet, Dallas, Tex. This type of steel can be found in most steel supply yards.

The base firebrick 38 can be an insulating firebrick having a dimension of about 2½ inches times 4½ inches by 9 inches and type K-28. It can be secured from Babcock and Wilcox, Refractory Division, Old Savannah Road, Augusta, Ga. The ceramic tile 366 can be a Delta T insulation board from Keene Corp., Insulation Operation, 1603 Fulford Street, Kalamazoo, Mich.

The upper ceramic tile 368 which is used for reflection can be Cerachrome 130 Insulation Board, Johns Manville, Ken-Caryl Ranch, Denver, Colo.

In FIG. 23 the raw material 412 can be clay. The clay is calcined to the product 430 and can be used as a light based aggregate and also can be used for kitty litter.

Again, the combustion of the fuel and air takes place substantially at the surface of the firebrick 38 or the surface of the ceramic tile 366 so that the burning of the air and fuel occurs at the hearth of the furnace.

As is recalled, a main advantage of this invention and this furnace is that less fuel is required to realize the desired temperature inside of the furnace. With this furnace, less air is required. Air comprises approximately 80% nitrogen and 20% oxygen. If less air is required for heating purposes then it is not necessary to heat the nitrogen. If it is not necessary to heat the nitrogen then less fuel is required. With many furnaces a large amount of air is introduced to remove the product. Another advantage of this furnace is that with the use of ceramic board and ceramic fibers there is better emissivity from the ceramic board and fibers than with firebrick. Because of the better emissivity from the ceramic board and fibers as compared with firebrick less fuel is required to realize the desired temperature in the furnace. In addition to this if a mixture of gas comprising carbon dioxide and oxygen is used, there is better emissivity of this gas than with air and fuel. For example, if a gas comprising 80% carbon dioxide and 20% oxygen is mixed with natural gas or vapor diesel fuel, a better emissivity is realized than if air and natural gas and air and vaporized diesel fuel is used. With better emissivity then less fuel is required to realize the desired temperature in the furnace. Carbon dioxide has better emissivity characteristics with respect to infrared radiation than nitrogen. The emissivity characteristics of nitrogen and infrared radiation are poor while the emissivity characteristics of carbon dioxide and infrared radiation are good. A combination of these factors indicates that less fuel is required to realize the desired temperature in the furnace than with a vertical furnace, a rotary furnace or a horizontal stationary furnace. With the increasing cost in the price of natural gas and also the increase in cost in the price of diesel fuel, it is desirable to use as small a quantity of fuel as possible to lessen the cost of processing the raw material to the desired product and realizing the desired temperature in the furnace.

With the furnace 350 it is also possible to introduce the material, viz., perlite, vermiculite, volcanic ash, pumice and zeolite, as introduced into the furnace 28. In addition to expanding or bloating materials, such as perlite and vermiculite, as in the furnace 28, the furnace 350 can also be used for calcining materials. For example, materials 220 which can be calcined or diatomaceous earth, clay, cement, titanium dioxide, fly ash, volcanic ash, natural zeolites, and pumice, to name a few. In addition, radioactive material can be treated and processed in the furnace 350 in a manner similar to that in which the radioactive material can be treated and processed in furnace 28. There can be introduced into the furnace 350 a solid material comprising the material to be treated or calcined along with fuel such as diesel oil or powdered coal, The aggregate of the material to be treated plus the diesel oil or the aggregate of the material to be treated plus the powdered coal can be introduced onto the ceramic tile or ceramic board 366 or onto the trough 380.

The furnace 350 can be used for the same operations as the furnace 28 in FIGS. 1–11 and FIGS 16–18. The furnace 350 is more fuel efficient or more energy efficient than the furnace 28. The furnace 350 has better emissivity characteristics as there is used the ceramic board of ceramic mat or the trough 380 or for the lower second heating material 366 and the third upper heating material 368. In addition, the fuel introduced into the furnace 350 can also be introduced into the mixture comprising carbon dioxide and oxygen. Instead of introducing the fuel with a mixture of air comprising nitrogen and oxygen, the fuel can be introduced with a gaseous mixture comprising carbon dioxide and oxygen. The carbon dioxide has better emissivity characteristics than the nitrogen and therefore, less fuel is required to realize the desired temperature with the carbon dioxide in the atmosphere in place of the nitrogen. The carbon dioxide has desirable emissivity characteristics in that it reflects infrared light waves and gives off infrared radiation while nitrogen does not have these characteristics.

In FIG. 25 there is illustrated a modification 468 of the furnace 350 and in FIG. 27 there is illustrated a modification 470 of the furnace 350. The modifications 468 and 470 have a plenum chamber 352 which as been described with respect to FIGS. 19, 20, 21 and 22. By way of recap there is placed on top of the plenum chamber 352 fire brick. With the modification 468 a ceramic fiber board 472 is placed on top of the fire brick 38. The fiber board 472 can be JN capped cerechrome 130. The fiber board 472 has previously been described.

On the inner edge of the fiber board 472 there is an upright inner refractory edge 474 and on the outer edge of the fiber board 472 there is an upright refractory edge 476. The refractory edges 472 can be secured to the upper surface of the fire brick 38 by suitable adhesive.

A silicon adhesive may be used for attaching the refractory edges 474 and 476 to the fire brick 38.

The refractory edges 474 and 476 rise above the fiber board 472 and also above the fire brick 38. The result is a recess for receiving material 480 to be heated. Loose particles 478 are placed in the recess to form a loose fire bed to a loose particle bed. The material 480 to be heated is placed on the loose particle 478. The loose particles can be the same material that is to be heated or the loose particles can be other products such as sand, clay pellets, silicon carbide which has a good emissivity. A practical way is to use the same material for loose particles 478 as the material 480 which will be heated. From experience I have found that this works well in the case of clay, sand and limestone. The loose particles 478 lie in the recess formed by the ceramic materials wherein the fiber board 472 is JN cerechrome 130 and the refractory edges 474 and 476 are some refractory products such as castable or a formed hard ceramic made from clay. The material 480 to be heated is introduced onto the bed of loose particles 478 by a chute or a conveyor 132 as illustrated in FIG. 4.

A doctor blade 134 is positioned above the bed of loose particles 478 so as to remove the heated product from the furnace. The heated product can fall onto the sloping conveyor 136 as also illustrated in FIG. 4 as well as FIG. 28.

In FIG. 27 there is no ceramic fiber board 472. The bed of loose particles 478 rest directly on the fire brick 38. The material 480 to be heated rests on the bed of loose particles 478. The foregoing comments with respect to FIG. 26 are applicable with respect to FIG. 27 and will not repeated.

The upper ceramic tile 368 is attached to the refractory brick 110 as illustrated and described with respect to FIG. 7. As illustrated and described in FIG. 7 there are bolts 114 which connect with the refractory brick 110. The bolts 114 connect with the ring 112.

In FIG. 28 there is a plan view looking down on the material 480 to be heated and some loose particles 478 on the furnace. There is the inner refractory edge 474 and outer refractory edge 476. There is illustrated the chute or conveyor 132 for loading the material 480 onto the loose particles 478. Further, there is the doctor blade 134 for removing the heated material and directing this heated material onto the chute 136.

The genesis of the bed of loose particles 478 was in the abrasion of the fiber ceramic board 472 or in the abrasion of the fire brick 38. In previous experience with a burning hearth furnace a burner surface was made from a permeable material that allowed a mixture of natural gas or combustible gas and air to flow upwardly and pass through the permeable material. Then the mixture could be ignited on the surface of the permeable material to have a burning hearth furnace. The permeable material is below a reflector. Both the surface of the permeable material and the reflector have a high emissivity which imparts to the burning hearth furnace a high efficiency in regard to gas consumption or the consumption of fuel. The product to be heated such as calcine, bloated, centered, roasted, dried, etc. is placed directly on the burner. After a period of time at a given temperature the product is ready to be removed from the furnace. Each product being treated has a different time-temperature requirement. The heated product may be blown off of the surface of the furnace with air or scraped off with a plow. In both of these instances there is an abrasive action on the burner surface or the surface of the permeable material when the heated product is removed. With an abrasion of the surface of the permeable material or the burner surface there is a maintenance problem caused by the abrasion to the burner surface or the surface of the permeable material. With this background I considered making a bed of loose particles on top of the premeable material or the burner surface and then place the product to be heated on top of the loose bed of particles. The first adea was to use one type of loose particles for all applications. The first material used was silicon-carbide grit. The second material was aluminum oxide particles. A problem developed in the potential mixing of a bed of loose particles with the heated product to be removed. Another potential loose bed material that could help alleviate this problem with steel shot where the steel shot got mixed with the heated product and the steel shot could be removed by means of a magnet so as to leave the heated product. After working with this for awhile I decided to try and use the product itself for the loose bed material. The product itself was made into the loose particles for 78. Examples of the products that work well in this manner are limestone, bloating clay (clay that is used for lightweight aggragate after being calcined and having a particle size of about ⅛" to about ½") and sand. My conclusion after trying the product as a bed of loose particles 478 was that the loose particles 478 would work in many applications such as sulfide ores for roasting, manganese based ores for roasting, carbon, pelletized clays, coke, baxuite, regeneration of spent lime and diatomaceous earth to name a few. The bed of loose particles 478 protects the surface of the permeable material or the burner deck such as fire brick 38 and fiber ceramic board 412. The bed of loose particles 478 practically emiminates a maintenance problem with the surface of the fire brick or the ceramic board. The burner deck can be the usual laminate structure of insulating fire brick as the base with the insulating fiber board laminated to the brick for the burner surface as illustrated and described with respect to FIG. 26 and can be the fire board itself as illustrated and described with respect to FIG. 27. The loose particles 478 are approximately ⅛" to 1½" in thickness. The average thickness of the bed of loose particles 478 should be 2 to 3 times the diameter of the product particles.

In essence, the bed of loose particles 478 underneath the material 480 to be heated lessens the maintenance problem on the surface of the ceramic fiber board 472 or on the surface of the brick 38.

There are some applications where the material to be heated needs a temperature lower than a calcining temperature or lower than what can be expected on the burner surface or on the surface of the fire brick 38. In these instances a solution is to put an intermediate plate between the surface of the burner or the fire brick or the ceramic fiber board and the reflector. The material to be heated is placed on the intermediate plate. There is a means of adjustment, vertically, for the intermediate plate so as to control the temperature of the plate by controlling the distance of the intermediate plate from the burner surface or the fire brick. The burner can be set at the most optimum condition for sufficient combustion. The intermediate plate absorbs the heat energy from the fuel burning on top of the burner surface or the fire brick and emits the heat energy to the intermediate plate and the material being heated. The reflector captures the heat energy from the intermediate plate and the material being heated and reflects it back to the material being heated. An example of the use of such a furnace is as follows. There is a reductive resin termed Amborane that selectively absorbs precious metals from solutions. When the reductive resin beads are loaded with the precious metals the beads are then washed, dried and roasted. The roasting temperature is in the range of 800° F. to 1700° F. The beads should be as thin a layer as possible so as to readily oxidize the resin. The roasting of the beads dries off the resin leaving the precious metal. The intermediate plate system is desirable for roasting the Amborane beads. The intermediate plate is impervious and the beads can be spread in a thin layer on the plate. The temperature required for roasting must be selected so as to fit the circumstances. Such an addition of an intermediate plate to the burning hearth furnace can have a number of potential uses where the temperature requirements are in the range of 500° F. to about 1700° F. In FIG. 29 there is a schematic illustration of such a furnace with an intermediate plate. There is the furnace 490 having a plenum chamber 352 which has been described with respect to FIGS. 19, 21, 26 and 27.

There can be two outwardly directed lugs 492. There is positioned on the upper surface of each lug a fluid actuated cylinder 494 having an extensionable ram 496. The reader is to understand that there can be more than two outwardly directed lugs 492 such as there may be four of the lugs or any convenient number. Also, on each of the lugs there may be a fluid actuated cylinder 494 with the ram 496.

There is a motor and pump combination 498. There is a valve 500. The motor and pump combination 498 by means of fluid line 502 connects with the valve 500. There is a fluid reservoir 504 which connects with the valve 500 by means of a fluid line 506.

There is a fluid line 508 which connects with the valve 500. The fluid line 508 connects with the slip fitting 510. A line 512 connects with the slip fitting 510 and also connects with the lower part of the fluid actuated cylinder 494.

There is a line 514 which connects with the upper part of the fluid actuated cylinder 494 and also connects with the slip fitting ring 516. A line 518 connects with the slip fitting ring 516 and with the reservoir 504. There is an intermediate plate 520 which connects with the free end of each extensionable ram 496.

There can be placed on the upper surface of the intermediate plate 520 material 522 to be heated. For example, the Amborane resin which has absorbed some of the precious metal can be the material 522. The mixture of flammable gas such as natural gas or gas comprising propane and butane and air can be introduced into the plenum chamber 352. The gas rises upwardly through the porous fire brick 38 and burns close to the upper surface of the fire brick 38 so as to have a burning hearth furnace. The heat energy is transferred to the intermediate plate 520 and the material 522 is heated in the range of approximately 500° F. to 1700° F. The intermediate plate can be considered to be a heating material.

The valve can be adjusted so that fluid flows from the motor and pump combination 498 through the fluid line 508 and through the fluid line 512 to the fluid actuated cylinder 494 so as to extend the extensionable ram 496 and move the intermediate plate 520 away from the fire brick 38. Then, the valve can be closed so that no fluid flows to the fluid actuated cylinders 494.

If it is desirable to have the intermediate plate 520 nearer the surface of the fire brick 38 the valve 500 can be adjusted so that fluid flows from the fluid actuated cylinder through the lines 512, the slip fitting 510, the line 508, and the line 506 to the reservoir 504.

A fluid actuated line 524 connects the reservoir 504 with the motor and pump combination 498.

It is to be realized that in place of the fluid actuated cylinders 494 and the extensionable rams 496 there can be a mechanical means to the screw connecting with the lug 492 and the intermediate plate 520 or ratchet means connecting with the lug 492 and the intermediate plate 520. The fluid actuated cylinder and the extensionable ram 496 make it possible to quickly and readily adjust the position of the intermediate plate with respect to the upper surface of the fire brick 38. In fact, with the fluid actuated cylinder 494 the position of the intermediate plate 520 can be varied while the plenum chamber 352, the fire brick 38 and the intermediate plate 520 are rotating. The motor and pump combination 498, reservoir 504, valve 500 and line 508 are stationary as well as the lines 518. The lines 512 and 514 rotate. Therefore, it is necessary to have the slip fittings 510 and 516 to allow the lines 512 and 514 to rotate.

After the material 522 has been heated there can be a doctor remove the heated product and the doctor can be like the doctor blade 134 in FIG. 4 or can be an air doctor for removing the product of the heated material 522.

I consider my invention to be new as I do not know of another furnace or another method for processing a material to make an expanded product or a calcined product. I do not know of another furnace having upper and lower bricks and wherein a material to be processed can be placed in rotating firebricks for being heat processed and also wherein the air introduced into the furnace and the air used in my method is, essentially, the air for combustion purposes and not for carrier purposes.

I consider my invention to be useful as it can be used to expand or bloat material such as vermiculite, perlite, volcanic ash, and pumice. Also, my furnace and my method can be used for calcining materials such as diatomaceous earth, clay, titanium dioxide, cement, fly ash, volcanic ash, zeolite, perlite, vermiculite, pumice, and the like. These products can be used for horticultural purposes fly ash, storing of radioactive wastes in a solid matrix, for lightweight concrete, and the like.

In preparing this patent application, a patent search was not made but information I know in regard to a rotary furnace, a vertical furnace, a stationary horizontal furnace for processing perlite and vermiculite has been disclosed. Also, there has been called to my attention three U.S. Pat. Nos. 2,659,521; 2,672,483; and 2,572,484.

With the foregoing and having presented my invention, what I claim is:

1. A furnace for heating a first subject to form a heated first subject, said furnace comprising:
- a. a first heating material having a first heating surface;
- b. a second heating material having a second heating surface;
- c. said first heating material and said second heating material being in an opposed relation and spaced apart to allow said first subject to be positioned between them;
- d. the distance between said first heating material and said second heating material may be as small as one-quarter of an inch;
- e. a bed of loose particles on said first heating surface;
- f. a first means to heat said first heating material being a means to introduce fuel to said furnace to restrict combustion of said fuel to occur above said first heating surface and below said second heating surface and in close proximity to said first heating surface to have a burning hearth;
- g. a second means to position said first subject on said bed of loose particles to be heated to form said heated first subject; and,
- h. a third means for removing said heated first subject from said bed of loose particles.

2. A furnace according to claim 1 and comprising:
- a. a means to move said first heating material and said bed of loose particles and said first subject as a unit and said second heating material relative to each other.

3. A furnace according to claim 1 and comprising:
- a. said first heating material being porous;
- b. said first means being capable of introducing a mixture of said fuel and air underneath said first heating material so that said mixture of said fuel and said air can rise and pass through said porous first heating material to be burned above said first heating surface and in close proximity to said first heating surface to have a burning hearth and below said second heating material.

4. A furnace according to claim 1 and comprising:
- a. said first heating material being first bricks.

5. A furnace according to claim 3 and comprising:
- a. said first heating material being porous bricks; and,
- b. said first bricks being an insulator to preclude combustion below said bricks.

6. A furnace according to claim 1 and comprising:
- a. said first heating material being first bricks and a ceramic material above said first bricks.

7. A furnace according to claim 3 and comprising:
- a. said first heating material being first bricks and a ceramic material above said first bricks;
- b. said bricks and said ceramic material being porous; and,
- c. said bricks and said ceramic material being insulators to preclude combustion of said bricks.

8. A furnace according to claim 1 and comprising:
- a. part of said first heating material being raised to define a recess for receiving and for positioning said bed of loose particles.

9. A furnace according to claim 8 and comprising:
- a. said first heating material being first bricks.

10. A furnace according to claim 9 and comprising:
- a. said first heating material being porous bricks; and,
- b. said first bricks being an insulator to preclude combustion below said bricks.

11. A furnace according to claim 6 and comprising:
- a. a ridge above said ceramic material to define a recess for said ceramic material to receive and to position said bed of loose particles.

12. A furnace according to claim 7 and comprising:
- a. a ridge above said ceramic material to define a recess for said ceramic material to receive and to position said bed of loose particles.

13. A furnace according to claim 1 and comprising:
- a. said first subject and said loose particles being different material.

14. A furnace according to claim 1 and comprising:
- a. said first subject and said loose particles being the same material.

15. A furnace according to claim 12 and comprising:
- a. said first subject and said loose particles being different material.

16. A furnace according to claim 12 and comprising:
- a. said first subject and said loose particles being the same material.

17. A furnace for heating a first subject to form a heated first subject, said furnace comprising:
- a. a first heating material having a first heating surface;
- b. a second heating material such as an intermediate plate having a second heating surface;
- c. a third heating material having a third heating surface;
- d. said third heating material and said second heating material being in an opposed relation and spaced apart to allow said first subject to be positioned between them;
- e. a first means to heat said first heating material being a means to introduce fuel to said furnace to restrict combustion of said fuel to occur above said first heating surface and below said second heating surface and in close proximity to said first heating surface to have a burning hearth; and,
- f. a second means to position said first subject on said second heating material to be heated to form said heated first subject.

18. A furnace for heating a first subject to form a heated first subject according to claim 17, said furnace comprising:
- a. said intermediate plate being positioned between said first heating material and said third heated material;
- b. said first heating material being below said intermediate plate; and,
- c. said third heating material being above said intermediate plate.

19. A furnace for heating a first subject to form a heated first subject according to claim 17, said furnace comprising:
- a. said first heating material being porous;
- b. said first means being capable of introducing a mixture of said fuel and air underneath said first heating material so that said mixture of said fuel and said air can rise and pass through said porous first heating material to be burned above said first heating surface and in close proximity to said first heating surface to have a burning hearth and below said second heating material to heat said intermediate plate to heat said first subject on said intermediate place.

20. A furnace for heating a first subject to form a heated first subject according to claim 17, said furnace comprising:

a. a third means to adjust the distance between said first heating material and said intermediate plate.

21. A furnace for heating a first subject to form a heated first subject according to claim 18, said furnace comprising:

a. a third means to adjust the distance between said first heating material and said intermediate plate.

22. A furnace for heating a first subject to form a heated first subject according to claim 19, said furnace comprising:

a. a third means to adjust the distance between said first heating material and said intermediate plate.

23. A method for heating a first subject, said method comprising:

a. positioning a first heating material in a substantially horizontal position;
b. positioning a bed of loose particles on said first heating material;
c. positioning said first subject on said bed of loose particles;
d. positioning a fuel on said first heating material to have said fuel burn in close proximity to said first heating material to have said first heating material a hearth and in effect have a burning hearth.

24. A method for heating a first subject according to claim 23, said method comprising:

a. introducing a mixture comprising oxygen and fuel underneath said first heating material and allowing said mixture to flow upwardly through said first heating material; and,
b. burning said fuel in close proximity to the upper surface of said first heating material.

25. A method for heating a first subject, said method comprising:

a. positioning a first heating material in a substantially, horizontal position;
b. positioning a second heating material on said first heating material;
c. positioning a bed of loose particles on said second heating material;
d. positioning said first subject on said bed of loose particles; and,
e. positioning a fuel on said second heating material to have said fuel burn in close proximity to said second heating material to have said second heating material a hearth and in effect a burning hearth.

26. A method for heating a first subject according to claim 25, said method comprising:

a. introducing a mixture comprising oxygen and fuel underneath said first heating material and said second heating material, and allowing said mixture to flow upwardly through said first heating material and said second heating material; and,
b. burning said fuel in close proximity to the upper surface of said second heating material.

27. A method for heating a first subject, said method comprising:

a. positioning a first heating material in a substantially horizontal position;
b. positioning a second heating material in a substantially horixontal position;
c. said second heating material being above said first heating material and spaced apart from said first heating material;
d. positioning a fuel on said first heating material to have said fuel burn in close proximity to said first heating material to have said first heating material a hearth and in effect having a burning hearth; and,
e. positioning said first subject on said second heating material.

28. A method for heating a first subject according to claim 27, said method comprising:

a. introducing a mixture comprising oxygen and fuel underneath said first heating material and allowing said mixture to flow upwardly through said first heating material; and,
b. burning said fuel in close proximity to the upper surface of said first heating material.

29. A method for heating a first subject according to claim 23, said method comprising:

a. said first subject and said loose particles being different materials.

30. A method for heating a first subject according to claim 23, said method comprising:

a. said first subject and said loose particles being of the same material.

31. A method for heating a first subject according to claim 25, said method comprising:

a. said first subject and said loose particles being different materials.

32. A method for heating a first subject according to claim 25, said method comprising:

a. said first subject and said loose particles being different materials.

* * * * *